United States Patent

Nonaka et al.

[11] Patent Number: 5,891,570
[45] Date of Patent: Apr. 6, 1999

[54] PLASTIC OPTICAL FIBER PREFORM HAVING A JACKET LAYER

[75] Inventors: Tsuyoshi Nonaka; Toshifumi Hosoya; Yuji Kobayashi; Yasuo Matsuda, all of Yokohama, Japan

[73] Assignee: Sumitomo Electric Industries, Ltd., Osaka, Japan

[21] Appl. No.: 837,103

[22] Filed: Apr. 14, 1997

Related U.S. Application Data

[62] Division of Ser. No. 381,874, filed as PCT/JP94/00962, Jun. 14, 1994, Pat. No. 5,639,512.

[30] Foreign Application Priority Data

| Jun. 18, 1993 | [JP] | Japan | 5-147277 |
| Jun. 18, 1993 | [JP] | Japan | 5-147278 |
| Jun. 23, 1993 | [JP] | Japan | 5-151774 |
| Feb. 22, 1994 | [JP] | Japan | 6-24137 |
| Feb. 25, 1994 | [JP] | Japan | 6-27743 |

[51] Int. Cl.$^6$ .................................. D02G 3/00
[52] U.S. Cl. .................... 428/375; 428/403; 264/1.4; 264/1.5; 264/2.7; 264/271.1; 427/296
[58] Field of Search .................. 264/1.4, 1.5, 271.1, 264/279, 2.7, 63; 427/40, 41, 237, 238, 296, 177; 428/375, 403

[56] References Cited

U.S. PATENT DOCUMENTS

| 4,212,663 | 7/1980 | Aslami | 65/144 |
| 4,443,239 | 4/1984 | Biswas et al. | 65/3.11 |
| 4,692,347 | 9/1987 | Yasuda | 427/40 |
| 4,937,029 | 6/1990 | Ishiharada et al. | 264/1.4 |
| 5,182,783 | 1/1993 | Bose et al. | 385/123 |

FOREIGN PATENT DOCUMENTS

| 2657556 | 8/1991 | France . |
| 52-5857 | 2/1977 | Japan . |
| 54-5743 | 1/1979 | Japan . |
| 54-30301 | 9/1979 | Japan . |
| 56-66807 | 6/1981 | Japan . |
| 58-178302 | 10/1983 | Japan . |
| 59-9603 | 1/1984 | Japan . |
| 60-57811 | 4/1985 | Japan . |
| 60-119509 | 6/1985 | Japan . |
| 60-230104 | 11/1985 | Japan . |
| 61-6604 | 1/1986 | Japan . |
| 63-60403 | 3/1986 | Japan . |
| 61-130904 | 6/1986 | Japan . |
| 61-162008 | 7/1986 | Japan . |
| 2-16504 | 1/1990 | Japan . |
| 3-64705 | 3/1991 | Japan . |
| 4-97302 | 3/1992 | Japan . |
| 4-124602 | 4/1992 | Japan . |
| 4-190204 | 7/1992 | Japan . |
| 6-3533 | 1/1994 | Japan . |
| 87/01071 | 2/1987 | WIPO . |

OTHER PUBLICATIONS

Ishigure et al., "Improvements in optical loss of High Bandwidth GI Polymer Optical Fiber," Polymer Preprints, Japan, vol. 41, No. 7 (1992), pp. 2942–2944.

Primary Examiner—Merrick Dixon
Attorney, Agent, or Firm—Foley & Lardner

[57] ABSTRACT

A process and an apparatus for producing a preform for plastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive index different from that of the polymer A onto a surface of a rod member rotating about an axis thereof, by use of vapor-phase deposition based on a CVD (Chemical Vapor Deposition) process, or a coating process. A plastic optical fiber preform including deposition layers having a gradually decreasing refractive index distribution is formed by changing the mixing ratio between the polymer A and the refractive index modifier constituting the deposition layer.

10 Claims, 15 Drawing Sheets

DIAGRAM OF GI-TYPE REFRACTIVE INDEX DISTRIBUTION

DIAGRAM OF
GI-TYPE REFRACTIVE
INDEX DISTRIBUTION

DIAGRAM OF PSEUDO-
GI-TYPE REFRACTIVE
INDEX DISTRIBUTION

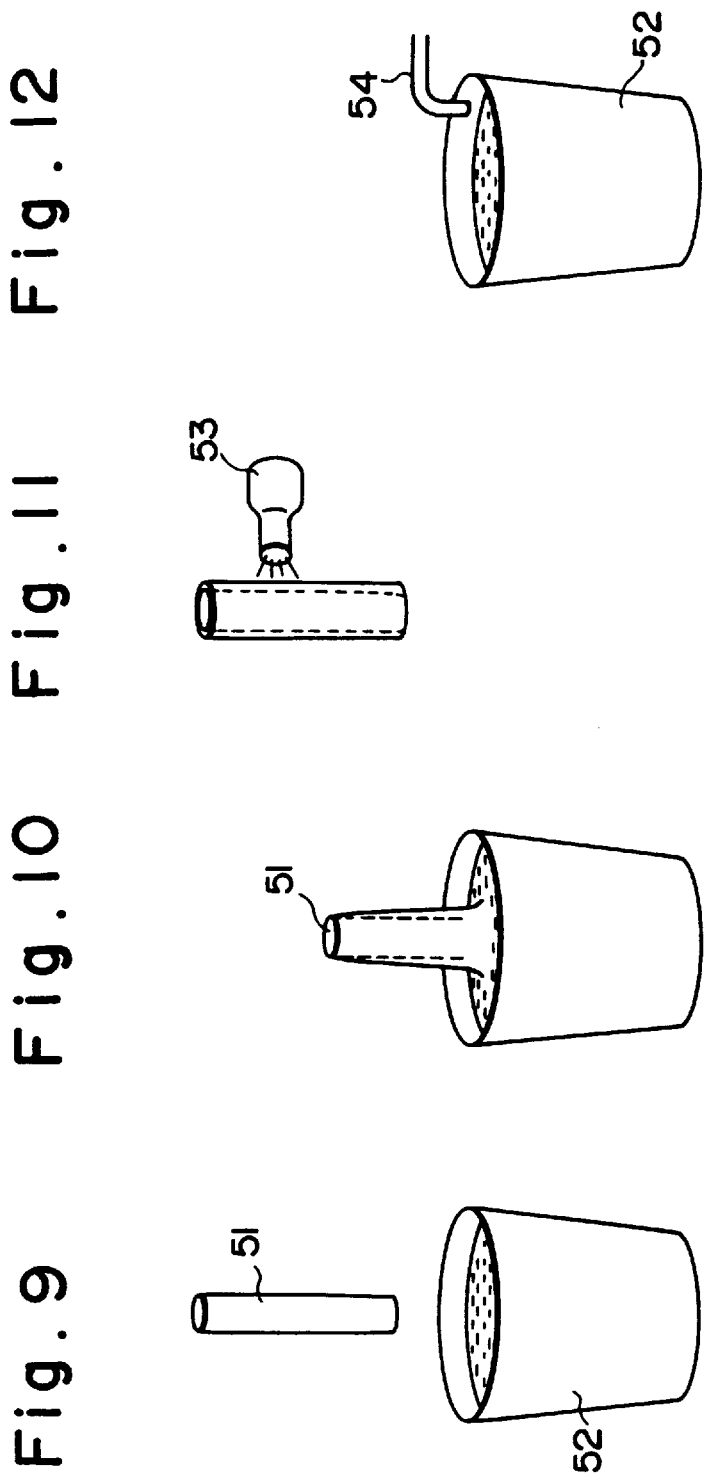

DIAGRAM OF GI-TYPE REFRACTIVE INDEX DISTRIBUTION

REFRACTIVE-INDEX DISTRIBUTION OF BBP-DOPED PMMA GI POF (A) : MMA/BBP = 7/1
(B) : MMA/BBP = 6/1
(C) : MMA/BBP = 5/1

Fig. 23
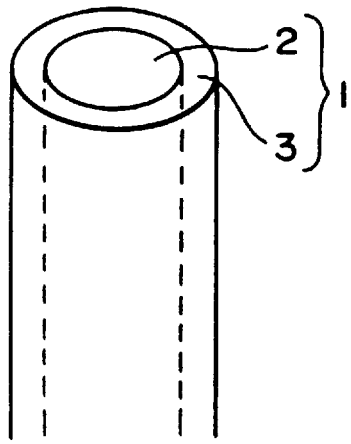
Fig. 24 DIAGRAM OF SI-TYPE REFRACTIVE INDEX DISTRIBUTION
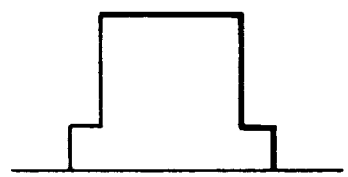
Fig. 25 DIAGRAM OF GI-TYPE REFRACTIVE INDEX DISTRIBUTION
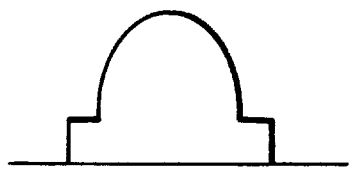

Fig. 26

|  | EXPERIMENT 1 | EXPERIMENT 2 | EXPERIMENT 3 | EXPERIMENT 4 | EXPERIMENT 5 |
|---|---|---|---|---|---|
| CORE DIAMETER $D_2$ | 20mm | 20 | 20 | 20 | 20 |
| CLADDING THICKNESS $D_1$ | 0mm | 2 | 8 | 10 | 2 |
| JACKET THICKNESS $D_3$ | 10mm | 8 | 2 | 0 | 8 |
| MATERIAL COST PER kg OF PREFORM | 1 | 1.2 | 2.1 | 2.5 | 1.2 |
| TRANSMISSION PROPERTY | 200dB/km | 100dB/km | 95dB/km | 95dB/km | 100dB/km |
| ADDITION OF ANTI-OXIDANT TO JACKET LAYER | ADDED | ADDED | ADDED | NONE | NONE |
| OPEN-AIR STANDING TEST | NO CHANGE OBSERVED ON SURFACE | NO CHANGE OBSERVED ON SURFACE | NO CHANGE OBSERVED ON SURFACE | DETERIORATION OBSERVED ON SURFACE | DETERIORATION OBSERVED ON SURFACE |

PLASTIC OPTICAL FIBER PREFORM HAVING A JACKET LAYER

This application is a division of application Ser. No. 08/381,874, filed Feb. 16, 1995 U.S. Pat. No. 5,659,516 which is a national stage of PCT/JP94/00962 filed Jun. 14, 1994.

TECHNICAL FIELD

The present invention relates to a preform for plastic optical fiber, a process and an apparatus for producing a plastic optical fiber, and a process for the drawing of a plastic optical fiber.

BACKGROUND ART

A plastic optical fiber comprising a core and a cladding both of which comprise a plastic is rather suitable for an optical transmission line to be used for a short distance such that the transmission loss in the line disposed between devices for sending and receiving an optical signal poses substantially no problem (for example, that between electronic devices), as compared with a glass optical fiber. In addition, since a plastic optical fiber can generally be produced at a lower cost than that of a glass optical fiber, such a fiber is widely used as an optical transmission line for a short distance. Thus, the importance of a plastic optical fiber has been increased, particularly in view of a project or design for a next-generation communication network such as LAN (local area network) and ISDN (integrated service digital network).

Heretofore, there has been put into practical use a plastic optical fiber 1, as shown n a schematic perspective view of FIG. 23, which comprises a core 2 comprising a resin such as PMMA (polymethyl methacrylate resin), PC (polycarbonate resin), or a copolymer thereof; and a cladding 3 comprising a fluorine-containing resin, etc., and has a refractive index distribution (profile) as shown in FIG. 24, i.e., a step-index (SI) type optical fiber.

In addition, as an optical fiber which is capable of transmitting a larger quantity of information per unit time than the above-mentioned SI-type optical fiber, there has been proposed a graded-index (GI) type optical fiber having a refractive index distribution as shown in FIG. 25. Such a GI-type optical fiber is disclosed in Japanese Patent Publication (KOKOKU) Nos. 5857/1977 (Sho 52-5857) and 30301/1979 (Sho 54-30301), and Japanese Laid-open Patent Application (KOKAI) Nos. 130904/1986 (Sho 61-130904) and 162008/1986 (Sho 61-162008). However, these optical fibers still have various unsolved problems in view of the production thereof, etc., and an optical fiber having a desired property has not been obtained yet.

More specifically, in the conventional plastic optical fibers, since the refractive index distribution has been formed by utilizing a special chemical reaction such as one employing a difference in reactivity, and one employing a gel effect, there has been a severe limitation on the conditions such as the size of a preform, and the kind of a material, in view of the provision of a desired refractive index. Accordingly, the conventional plastic optical fibers have posed a problem such that mass production thereof is difficult or a fiber material having excellent transmission property and reliability is difficult to be obtained.

Further, in the conventional optical fibers as described above, it is difficult to freely control the reaction for providing the refractive index distribution, and therefore it has been difficult to obtain a fiber having an ideal GI-type refractive index distribution in a good yield.

Furthermore, Japanese Laid-Open Patent Application No. 16504/1990 (Hei 2-16504) discloses a process for producing a plastic optical fiber by concentrically extruding a laminate product of two or more species of polymerizable mixtures for providing mutually different indices. However, according to the present inventors' investigation, such a process has the following problems.

More specifically, since the above process is a laminating-extrusion process and it can provide extrusion steps corresponding to only about ten layers, the resultant product is inevitably caused to have a stepped-type refractive index distribution. When an optical fiber having such a stepped refractive index distribution is used, it is difficult to transmit a large quantity of information. Further, in the above process, it is suggested that a continuous and smooth refractive index distribution can be provided by further diffusing a monomer into the product after the laminating-extrusion process. However, when such monomer diffusion is employed, the number of the production steps is increased and the resultant productivity is lowered. In addition, since the above process includes an operation for conducting monomer diffusion the control of which is difficult, it is difficult to provide an ideal GI-type refractive index distribution.

Further, there is proposed a process for producing a preform for plastic optical fiber having a continuously changing refractive index by repetitively pouring two species of materials having mutually different refractive index differences into a hollow cylindrical member and subjecting such materials to polymerization and lamination under the action of a centrifugal force (as described in Japanese Laid-Open Patent Application No. 119509/1985 (Sho 60-119509)). However, it is not necessarily easy in this process to regulate the resultant refractive index so as to provide a desired and designed value, and the production cost tends to become somewhat higher.

In addition, Japanese Laid-Open Patent Application No. 124602/1993 (Hei 4-124602) discloses a process for producing a plastic optical fiber by subjecting a core material to fiber spinning so as to provide a predetermined diameter, and coating the resultant product with a cladding material. However, in order to produce a GI-type plastic optical fiber by such a coating operation using a cladding material, it is necessary to conduct multiple-stage coating operations, so that the production process becomes complicated.

On the other hand, it has also been proposed that a GI-type preform (base material) is prepared in advance and is subjected to hot stretching to provide a fiber (Polymer Preprints, Japan, vol. 41, No. 7, pp. 2942–2944, Autumn of 1992). It is conceivable that such a process can reduce the number of production steps and can prepare various species of fibers having different outer diameters. However, according to the present inventors' investigation, in such a process wherein the GI-type preform is simply inserted into a drawing furnace to be subjected to fiber drawing, a fluctuation in the outer diameter after the fiber drawing is liable to occur and the strength of the resultant fiber thus obtained tends to become lower than that of fiber produced by another process.

In general, in a plastic optical fiber to be actually used, a cover portion called as a jacket layer or a sheath layer is further provided on the above-described cladding layer so as to protect the main body of the plastic optical fiber (as disclosed in FIG. 1 of Japanese Laid-Open Patent Application No. 230104/1985 (Sho 60-230104)). As disclosed in Japanese Laid-Open Patent Application Nos. 178302/1983

(Sho 58-178302) and 57811/1985 (Sho 60-57811), etc., a fiber having a good heat resistance and a good weathering resistance can be provided by selecting a jacket or sheath material having a good heat resistance and a good weathering resistance.

Further, Japanese Laid-Open Patent Application No. 190204/1992 (Hei 4-190204) discloses a technique such that an inorganic filler is incorporated into a jacket layer so as to facilitate the formation of metal plating on the surface of the jacket layer.

In these conventional methods, an optical fiber preform is drawn into a fiber shape and then a cover portion is formed on the resultant fiber by utilizing a method such as die coating and extrusion, and therefore the formation of the cover portion is troublesome and the productivity becomes low, whereby the resultant production cost becomes high.

It is also theoretically conceivable that, instead of the provision of the above-mentioned cover portion, the main body of the optical fiber is caused to have a considerably large outer diameter so that the cladding layer may also function as a protecting layer. In this case, however, there is posed a new problem such that the amount of a plastic material to be used per unit length is increased. Further, since the plastic material to be used for a plastic optical fiber is one having a high optical transparency which has been produced so as to provide a high purity through purification, and has a high production cost, an increase in the amount of such as plastic material to be used per unit length constitutes a factor of an increase in the production cost.

An object of the present invention is to provide a plastic optical fiber or a preform therefor, and a process and an apparatus for producing such a plastic optical fiber or a preform, which have solved the above-mentioned problems encountered in the Background Art.

Another object of the present invention is to provide a process and an apparatus for producing a plastic optical fiber or a preform therefor, which has a desired refractive index distribution and is capable of being produced easily.

A further object of the present invention is to provide a process and an apparatus for producing a plastic optical fiber or a preform therefor, which has a desired refractive index distribution and is capable of being produced at a low cost.

A further object of the present invention is to provide a (drawing) process for producing a plastic optical fiber which can maintain a sufficient mechanical strength and can assure a long-term reliability after the fiber formation.

A further object of the present invention is to provide a (drawing) process for producing a plastic optical fiber which can suppress a change in the outer diameter thereof due to heat and can assure a long-term reliability after the fiber formation.

A further object of the present invention is to provide a process for producing a plastic optical fiber having a desired refractive index distribution and having a jacket layer which is capable of being easily formed.

A further object of the present invention is to provide a process for producing a plastic optical fiber having a desired refractive index distribution and having a jacket layer which has been reduced in the production cost.

DISCLOSURE OF INVENTION

As a result of earnest study, the present inventors have found that it is very effective in achieving the above object to form, on an surface of a rod member rotating around an axis, a laminate or multi-layer structure which comprises a layer including a polymer and a material having a refractive index different from that of the polymer (hereinafter, referred to as "refractive index modifier") and in which the ratio of the polymer to the refractive index modifier is changed.

The process for producing a plastic optical fiber preform according to the present invention is based on the above discovery. More specifically the present invention provides a process for producing a preform for plastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive index different from that of the polymer A onto a surface of a rod member rotating about an axis thereof, by use of vapor-phase deposition based on a CVD (Chemical Vapor Deposition) process, wherein the mixing ratio between the polymer A and the refractive index modifier constituting the deposition layer is changed thereby to gradually increase the refractive index of the deposition layer.

In the above process for producing a preform for plastic optical fiber according to the present invention, it is preferred that the refractive index modifier comprises a refractive index modifier B having a refractive index ($N_b$) higher than that of the polymer A, and the mixing ratio of the refractive index modifier B constituting the deposition layer is gradually decreased.

On the other hand, in the above process for producing a preform for plastic optical fiber according to the present invention, it is also possible that the refractive index modifier comprises a refractive index modifier C having a refractive index ($N_c$) lower than that of the polymer A, and the mixing ratio of the refractive index modifier C constituting the deposition layer is gradually increased.

The present invention also provides an apparatus for producing a preform for plastic optical fiber by forming a deposition layer comprising a polymer A (refractive index: $N_a$) and a refractive index modifier having a refractive index different from that of the polymer A on a surface of a rod member, by use of vapor-phase deposition based on a CVD process, the apparatus comprising:

a rotating device for supporting the rod member so as to be rotatable about an axis thereof, a supply pipe for supplying vapor of a raw material for forming the deposition layer to a surface of the rod member, a heating device for heating the deposition layer deposited on the outside of the rod member, and raw material-supplying means for supplying the vapor of the raw material for forming the deposition layer to the supply pipe;

wherein the raw material-supplying means includes refractive index-regulating means for changing the mixing ratio of the refractive index modifier in the vapor of the raw material.

In the present invention, it is also possible to use a coating process instead of the above CVD process.

More specifically, the present invention further provides a process for producing a preform for plastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive index different from that of the polymer A onto a surface of a rod member rotating about an axis thereof, by use of a coating process, wherein the mixing ratio between the polymer A and the refractive index modifier constituting the deposition layer is changed thereby to gradually decrease the refractive index of the deposition layer.

The present invention further provides an apparatus for producing a preform for plastic optical fiber by forming a deposition layer comprising a polymer A (refractive index: $N_a$) and a refractive index modifier having a refractive index different from that of the polymer A on a surface of a rod member, by use of a coating process, the apparatus comprising:

a rotating device for supporting the rod member so as to be rotatable about an axis thereof, coating means for supplying a raw material for forming the deposition layer to the surface of the rod member, a heating device for heating the deposition layer deposited on the outside of the rod member, and raw material-supplying means for supplying the raw material for forming the deposition layer to the coating means;

wherein the raw material-supplying means includes refractive index-regulating means for changing the mixing ratio of the refractive index modifier in the raw material.

In the above process for producing a preform for plastic optical fiber by use of a coating process according to the present invention, it is preferred that an initial coating solution is prepared by using the polymer A (refractive index: $N_a$) and a refractive index modifier B having a refractive index ($N_b$) higher than that of the polymer A, and the mixing ratio of the refractive index modifier B in the coating solution is gradually decreased.

On the other hand, in the above process for producing a preform for plastic optical fiber according to the present invention, it is also possible that an initial coating solution is prepared by using the polymer A (refractive index: $N_a$) and a refractive index modifier C having a refractive index ($N_c$) lower than that of the polymer A, and the mixing ratio of the refractive index modifier C in the coating solution is gradually increased.

In the process for producing an optical fiber preform according to the present invention as described above (by use of either a CVD process or a coating process), it is not necessary to utilize a special chemical reaction in the production step for the preform, and therefore the degree of freedom is markedly increased in the size of a preform to be prepared and/or the selection of kind of material to be used therefor. Consequently, according to the present invention, a preform having a size suitable for a production system may readily be produced while using a material capable of imparting an excellent property to the resultant optical fiber, and therefore it is easy to mass-produce a preform having a desired refractive index distribution and a desired property.

Particularly, the present invention has an advantage such that a non-polymerizable material capable of imparting an excellent transmission property may be selected as the above-mentioned refractive index modifier.

The present inventors have further found that in a process for drawing a GI-type preform into a fiber, the strength of the fiber is changed depending on the orientation of the polymer constituting the fiber, and have further found that it is very effective in solving the above problem in the fiber strength to appropriately adjust a drawing tension at the time of the drawing of the fiber.

Accordingly, the present invention further provides a process for forming a plastic optical fiber by drawing while melting an optical fiber preform under heating; the optical fiber preform comprising, at least, a core comprising an organic polymer and a cladding layer comprising an organic polymer and disposed on the outer circumference of the core;

wherein the drawing is conducted under a drawing tension of 10 g or more until winding-up of the optical fiber.

In addition, according to the present inventors' investigation, it has been found that in a process for drawing a GI-type preform into a fiber, a fluctuation in the outer diameter of the resultant fiber after the completion of the drawing is provided depending on the orientation of the polymer constituting the cladding of the fiber, and that it is very effective in solving the above problem of the fluctuation in the outer diameter of the fiber after the drawing to appropriately adjust a drawing tension at the time of the drawing of the fiber.

Accordingly, the present invention further provides a process for forming a plastic optical fiber by drawing while melting an optical fiber preform under heating; the optical fiber preform comprising, at least, a core comprising an organic polymer and a cladding layer comprising an organic polymer and disposed on the outer circumference of the core;

wherein the drawing is conducted under a drawing tension of 100 g or less until winding-up of the optical fiber.

In addition, the present invention further provides a preform for plastic optical fiber, comprising:

a core comprising an organic polymer, a cladding layer comprising an organic polymer and disposed on the outer circumference of the core, and a jacket layer disposed on the outer circumference of the cladding layer;

wherein the jacket layer comprises a material which has the same quality as the material constituting the cladding layer, and has a purity lower than that of the material constituting the cladding layer.

BRIEF DESCRIPTION OF THE DRAWINGS

FIG. 9 is a schematic perspective view for illustrating a step (immersing step) in a case where an optical fiber preform having a jacket layer is prepared by a coating method using casting.

FIG. 10 is a schematic perspective view for illustrating a step (pulling-up step) in a case where an optical fiber preform having a jacket layer is prepared by a coating method using casting.

FIG. 11 is a schematic perspective view for illustrating a step (drying step) in a case where an optical fiber preform having a jacket layer is prepared by a coating method using casting.

FIG. 12 is a schematic perspective view for illustrating a step (step of adding a refractive index modifier) to be conducted in a case where an optical fiber preform having a jacket layer is prepared by a coating method using casting.

FIG. 23 is a schematic perspective view showing an example of the structure of a conventional plastic optical fiber preform.

FIG. 24 is a schematic view showing an SI-type refractive index distribution.

FIG. 25 is a schematic view showing a GI-type refractive index distribution.

FIG. 26 is a table showing the results of the evaluation obtained in Example 21.

BEST MODE FOR CARRYING OUT THE INVENTION

Figure 1:
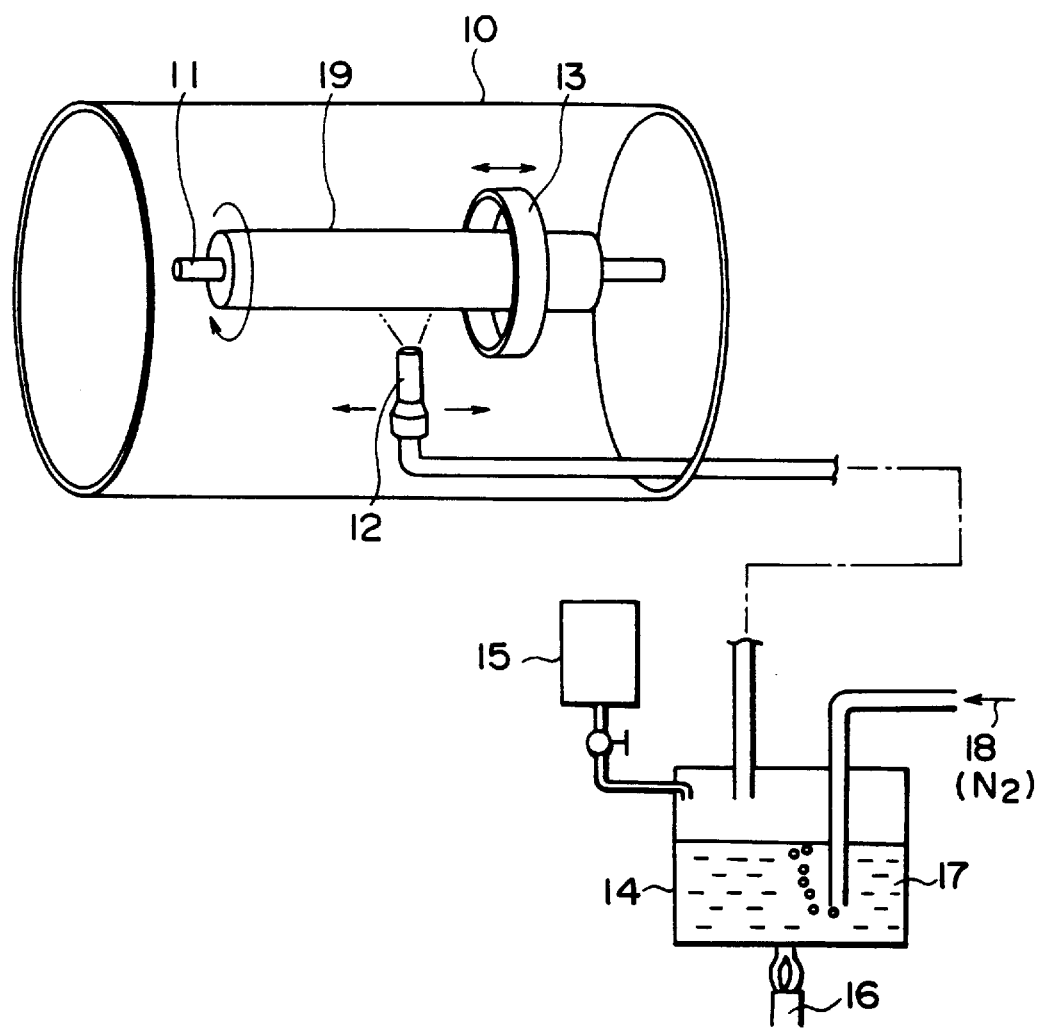
FIG. 1 is a schematic perspective view showing an embodiment of the apparatus for producing an optical fiber preform by utilizing deposition based on an outside-surface CVD process in the present invention.

Hereinbelow, the present invention will be described in detail with reference to the accompanying drawings as desired.

(Polymer)

In the present invention, as the polymer A (refractive index: $N_a$) constituting a deposition layer to be deposited on an inside-surface of a hollow cylindrical member rotating about an axis, a known transparent polymer may be used without particular limitation. Specific example of such a polymer may include: homopolymers of methyl methacrylate (polymethyl methacrylate: PMMA), polycarbonate (PC); or a transparent copolymer of methyl-methacrylate and another monomer. Preferred examples of such an "another monomer" may include: acrylic monomers such as monofunctional (meth)acrylates, fluorine-containing or fluorinated alkyl (meth)acrylates, polyfunctional (meth) acrylates, polyfunctional (meth)acrylates, acrylic acid, and methacrylic acid; and styrene-type monomers such as styrene and chlorostyrene.

Among the polymers as described above, polymethyl methacrylate (refractive index n=1.490) or polycarbonate (n=1.59) may particularly preferably be used.

(Refractive index modifier)

In the present invention, as the material (refractive index modifier) having a refractive index different from that ($N_a$) of the above polymer A, either of a refractive index modifier having a refractive index ($N_b$) higher than that of the polymer (refractive index modifier B), and a refractive index modifier having a refractive index ($N_c$) lower than that of the polymer (refractive index modifier C) may be used.

The molecular weight of the refractive index modifier is not particularly restricted, as long as it may provide a desired refractive index distribution and may be stably copresent with the above-mentioned polymer. In addition, the refractive index modifier per se may have a polymerizable functional group (for example, an unsaturated polymerizable group such as vinyl group $CH_2=CH-$). In other words, the refractive index modifier may be a monomer or a mixture thereof, or an oligomer or polymer.

The absolute value of a difference between the refractive index $N_a$ of the polymer A and the refractive index ($N_b$ or $N_c$) of the above modifier, $|N_a-N_b|$ or $|N_a-N_c|$, may preferably be 0.01 or more, more preferably 0.02 or more (particularly preferably, 0.03 or more).

In the present invention, when the above polymer A comprises polymethyl methacrylate (PMMA) ($N_a$=n=1.49), preferred examples of the refractive index modifier to be used in combination with the polymer A may include: as the modifier B having a higher refractive index, butyl benzyl phthalate ester ($N_b$=n=1.536), 2-phenylethyl acetate (n=1.51), dimethyl phthalate (n=1.515), diphenyl sulfide (n=1.635), vinyl benzoate (n=1.577), benzyl methacrylate (n=1.568), and diallyl phthalate (n=1.518), etc. Among the above specific examples, vinyl benzoate, benzyl methacrylate, and diallyl phthalate are refractive index modifiers having a polymerizable functional group.

On the other hand, specific examples of the refractive index modifier C having a lower refractive index may include: hexyl acetate ($N_c$=n=1.408), bis(3,5,5-trimethylhexyl) phthalate (n=1.487), and bis(2-methylhexyl) phthalate (n=1.486), etc. (Deposition method)

In the present invention, as the process for forming a multi-layer structure (outside-surface deposition) comprising a layer wherein the ratio of the above polymer A to the refractive index modifier is changed, on an inner surface of a hollow cylindrical member rotating about an axis, either of a vapor deposition process and a coating process may be used. In an embodiment using the vapor deposition process, a chemical vapor deposition (CVD) process may preferably be used.

(Production of preform by CVD)

Hereinbelow, there is described an embodiment of the present invention for producing a preform for plastic optical fiber by using an outside-surface CVD process with reference to FIG. 1.

FIG. 1 is a schematic perspective view showing an embodiment of the apparatus to be usable in the production of an optical fiber preform according to the present invention (an apparatus for producing an optical fiber preform according to the present invention).

Referring to FIG. 1, this apparatus is one for producing a plastic optical fiber preform by depositing vapor of a raw material on the outside of a rod member through a CVD process. This apparatus comprises: a rotating device (not shown) located in a reactor 10, for supporting a rod member 11 so as to be rotatable around an axis thereof; a supply pipe 12 (in the form of a nozzle in FIG. 1) which is reciprocatingly movable in the direction of the above axis so as to supply the vapor of the raw material supplied thereto onto the surface of the rod member 11; a heating device 13 (in the form of a ring heater in FIG. 1) for conducting a heat treatment of an organic raw material deposited on the surface of the rod member 11, which is located so as to be reciprocatingly movable in an axis direction similarly as the supply pipe 12 (e.g., movable in interlocking or coordination with the supply pipe 12) ; and a raw material-supplying means for supplying vapor as a raw material for the formation of a deposition layer (in the form of vapor of an organic raw material in FIG. 1). In the embodiment shown in FIG. 1, the raw material-supplying means comprises a supply vessel 14 (in the form of a supply tank in FIG. 1) and a vessel 15 for a refractive index modifier (in the form of a refractive index modifier tank in FIG. 1) for supplying the refractive index modifier to the supply vessel 14.

In the embodiment of FIG. 1, the raw material for a polymer to be supplied to the above nozzle 12, is stored as an organic raw material 17 in the supply tank 14 provided with a heating means 16 together with a solvent, and an inert gas 18 (such as $N_2$, Ar and He) is introduced into the supply tank 14 so as to supply the vapor of the above material to the nozzle 12.

On the other hand, a refractive index modifier is stored in the refractive index modifier tank 15, and the refractive index modifier having a different refractive index is appropriately supplied to the supply tank 14 from the refractive index modifier tank 15 so as to control the resultant refractive index. More specifically, for example, as the deposition of a deposition layer comprising the above-mentioned polymer A and refractive index modifier C is repeated on the surface of the rod member 11, the refractive index modifier C is introduced into the supply tank 14 from the refractive index modifier tank 15, whereby the refractive index in the supply tank 14 is gradually changed to provide a predetermined gradient in the optical refractive index (refractive index distribution).

In the embodiment of FIG. 1, when a refractive index modifier B having a refractive index higher than that of the polymer A is used, for example, a predetermined mixture comprising the polymer A and the refractive index modifier B (a mixture having a refractive index higher than that of the polymer A per se) is placed in the supply tank 14, and the polymer A stored in the refractive index modifier tank 15 is gradually supplied to the supply tank 14 thereby to provide a desired refractive index distribution.

In the production apparatus as described above, the heating means 16 is not necessarily required. In other words, the heating means 16 may be omitted depending on the kind of the organic material to be used in combination with the apparatus.

Hereinbelow, there is described an embodiment of the process for producing a preform for a plastic optical fiber, by use of the apparatus shown in FIG. 1.

Referring to FIG. 1, in this embodiment, the polymer A has been poured into the supply tank 14 as an organic raw material solution 17 together with a solvent which is capable of dissolving the polymer A. As the deposition of a deposition layer comprising the polymer A and the refractive index modifier C (having a refractive index lower than that of the polymer A) is repeated on the surface of the rod member 11, the refractive index in the supply tank 14 is gradually changed by introducing the refractive index modifier C from the refractive index modifier tank 15 to the supply tank 14, whereby a predetermined gradient in the optical refractive index (refractive index distribution) is provided.

In addition, as shown in FIG. 1, the nozzle 12 is moved reciprocatingly in the direction of an axis while the rod member 11 is rotated, and the vapor of the raw material is sprayed onto the surface of the rod member 11 and heating is conducted by using the heating device 13, thereby to deposit the raw material having a gradually changing refractive index on the surface of the rod member 11. Through the above procedure, there is formed a plastic optical fiber preform wherein the refractive index is gradually decreased in the radial direction of from the center of the resultant preform toward the outer periphery thereof.

Figure 2:
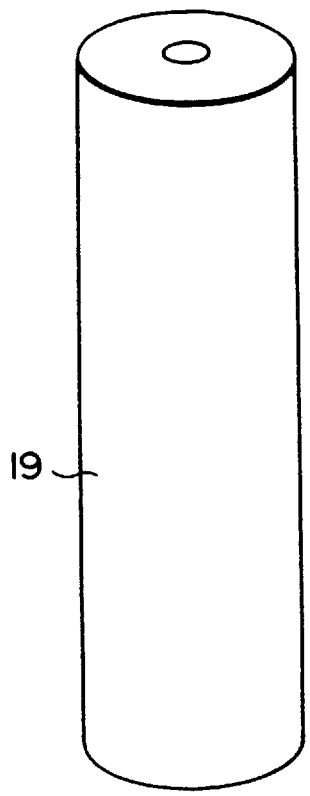
FIG. 2 is a schematic perspective view showing an example of a preform provided by the deposition shown in FIG. 1.
Figure 3:
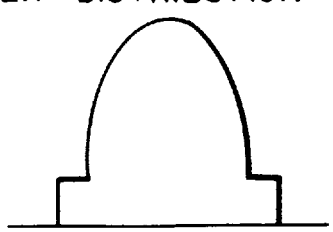
FIG. 3 is a schematic view showing a refractive index distribution of the preform shown in FIG. 2.

After the CVD deposition as described above is completed, there is provided a preform as shown in a schematic perspective view of FIG. 2. FIG. 3 schematically shows a profile of a refractive index distribution (GI-type distribution) of the resultant preform 19.

A desired plastic optical fiber may be obtained by subjecting the optical fiber preform thus obtained to an ordinary fiber drawing procedure. In such a drawing procedure, a plastic fiber may for example be obtained by drawing the above fiber preform under melting due to heating, while the fiber preform is kept vertically.

In the present invention, a substance which is polymerizable under the action of energy such as light (for example, benzoin, benzoin methyl ether, benzoin ethyl ether, benzoin isopropyl ether, benzoin isobutyl ether, 2-methylbenzoin, benzil, benzil dimethyl ketal, benzil diethyl ketal, etc.) may be used as at least one of the raw material for the above polymer A (such as monomer) and the refractive index modifier B, and it may be subjected to polymerization (for example, photo-polymerization) under the application of energy ray such as ultraviolet ray, to fix the predetermined refractive index distribution as described above. In such an embodiment, it is particularly preferred to use an initiator for the photo-polymerization wherein cleavage may occur between different species of atoms due to light energy (the energy required for such cleavage is smaller than that required for the cleavage of a single bond between atoms of the same kind). Specific examples of an initiator wherein cleavage may occur between different species of atoms dye to light energy may include those as described below.

<Initiators wherein cleavage may occur at a single bond between different species of atoms; carbon and phosphorus atoms> benzoyl diphenylphosphine oxide
benzoyl dimethylphosphine oxide
benzoyl diethylphosphine oxide
2-methylbenzoyl diphenylphosphine oxide
2-methylbenzoyl dimethylphosphine oxide
2-methylbenzoyl diethylphosphine oxide
2,4-dimethylbenzoyl diphenylphosphine oxide 2,4-dimethylbenzoyl dimethy-phosphine oxide
2,4-dimethylbenzoyl diethylphosphine oxide
2,4,6-trimethylbenzoyl diphenylphosphine oxide
2,4,6-trimethylbenzoyl dimethylphosphine oxide
2,4,6-trimethylbenzoyl diethylphosphine oxide
<Initiators wherein cleavage may occur at a single bond between different species of atoms; carbon and sulfur atoms>
benzoyl phenyl sulfide
2-methylbenzoyl phenyl sulfide
4-methylbenzoyl phenyl sulfide
2,4-dimethylbenzoyl phenyl sulfide
2,4,6-trimethylbenzoyl phenyl sulfide
4-chlorobenzoyl phenyl sulfide
benzoyl 2-methylphenyl sulfide
benzoyl 4-methylphenyl sulfide
benzoyl 2,4-dimethylphenyl sulfide
benzoyl 2,4,6-trimethylphenyl sulfide
benzoyl 4-chlorophenyl sulfide In a case where such a photo-polymerization is effected, a time-dependent change in the refractive index distribution based on heat, etc. may further be suppressed, thereby to provide an optical fiber which can particularly suitably be used in a region with a high temperature or considerable heating.

Further, in such an embodiment utilizing photo-polymerization, it is also possible to constitute the rod member 11 by use of a material capable of transmitting ultraviolet light and to supply ultraviolet light from the inside of the rod member 11. Such an embodiment wherein ultraviolet light is supplied from the inside of the rod member 11 is preferred in view of efficiency in the polymerization. (Production of preform by coating method)

Figure 4:
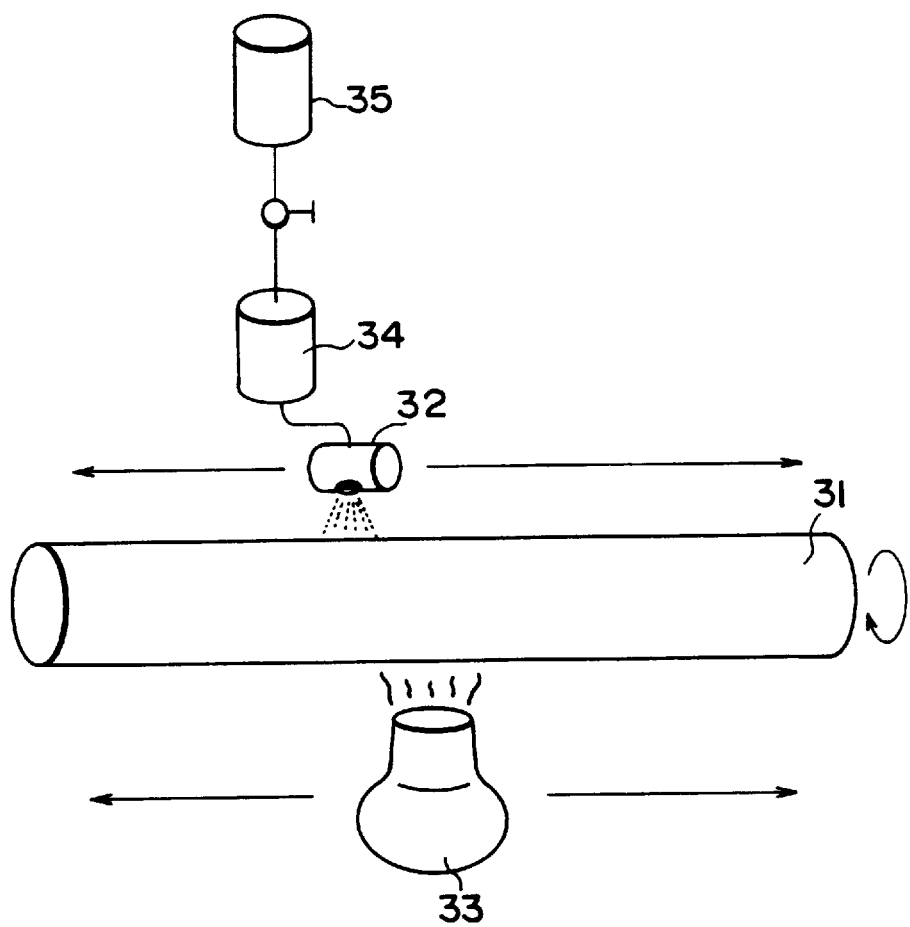
FIG. 4 is a schematic perspective view showing an embodiment of the apparatus for producing an optical fiber preform by utilizing deposition based on an outside-surface coating process in the present invention.

Next, there is described an embodiment for producing a preform for plastic optical fiber by utilizing an outside-surface coating process in the present invention with reference to FIG. 4.

FIG. 4 is a schematic perspective view showing an embodiment of an apparatus usable for the production of an optical fiber preform according to the present invention (an apparatus for producing an optical fiber preform according to the present invention).

Referring to FIG. 4, this apparatus comprises: a rotating device (not shown) for supporting a rod member (in the form of a starting rod in FIG. 4) 31 so as to be rotatable about an axis thereof; a coating means (in the form of a spraying nozzle in FIG. 4) 32 which is located movably in the direction of the axis thereof so as to apply an organic material onto the surface of the rod member 31; a drying device 33 for heating the organic material deposited on the outside of the rod member 31 to remove a solvent contained therein; a supply tank 34 for supplying the organic material; and a tank 35 for a refractive index modifier.

Hereinbelow, there is described an embodiment of the process for producing a preform for plastic optical fiber by use of the apparatus shown in FIG. 4.

Referring to FIG. 4, the polymer A has been poured as a spraying raw material into the supply tank 34 together with a solvent which is capable of dissolving the polymer A, while a refractive index modifier C is stored in the refractive index modifier tank 35. As the spraying onto the surface of the rod member 31 is repeated, the refractive index modifier C is supplied from the refractive index modifier tank 35 to the supply tank 34 to gradually change the refractive index in the supply tank 34.

In addition, as shown in FIG. 4, while the rod member 31 is rotated, the nozzle 32 is moved reciprocatingly in the direction of the axis of the rod member 31, and a raw material (composition) comprising the polymer A and the refractive index modifier C is sprayed under drying based on the dryer 33. By use of the above procedure, the spraying raw material having a gradually changing refractive index is applied by spraying thereby to form a cladding layer in which the refractive index is gradually decreased in the radial direction from the center of the preform toward the outer periphery thereof. Through the above procedure, there may be obtained a desired plastic optical fiber preform (FIGS. 2 and 3).

Then, the optical fiber preform thus obtained may be subjected to an ordinary fiber drawing procedure, in the same manner as in the above embodiment using the CVD process. For example, a desired plastic optical fiber may be obtained by subjecting the above optical fiber preform to melting under heating, while the preform is kept vertically.

In the above embodiment shown in FIG. 4, a spraying-type coating process is used. However, the coating means usable in the present invention is not restricted to such means. More specifically, in the present invention, any of known coating means may be used as the above coating means 32 without particular limitation.

Figure 5:
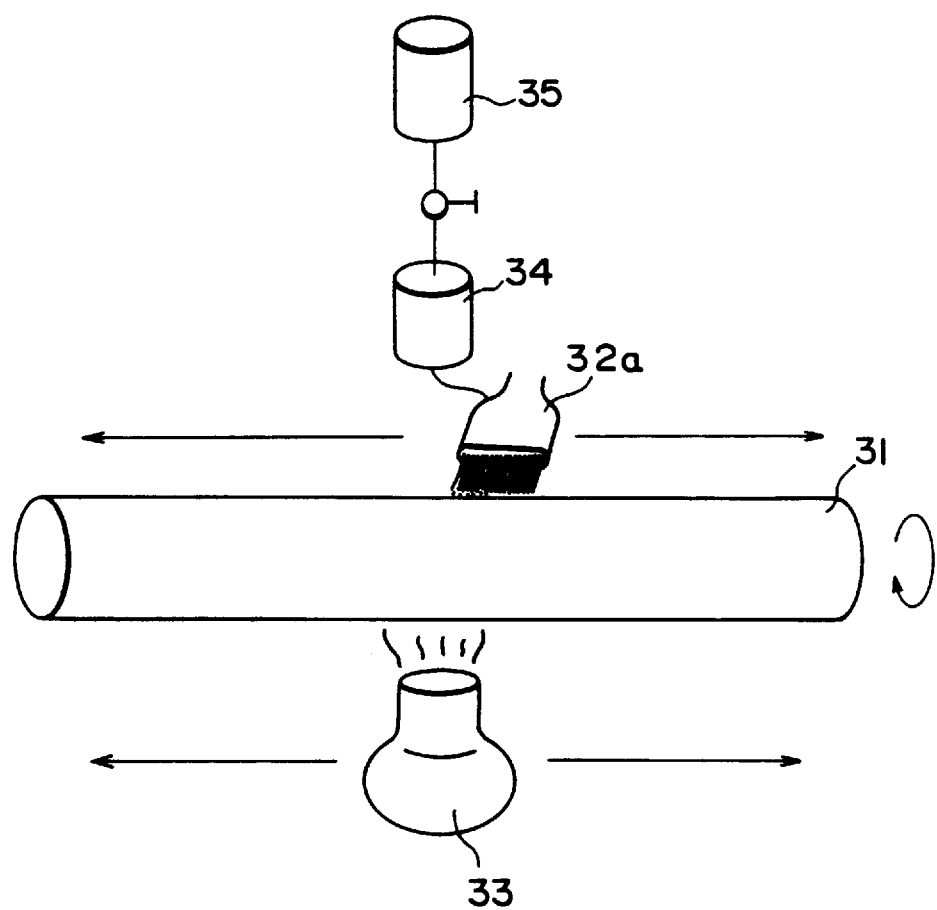
FIG. 5 is a schematic perspective view showing another embodiment of the apparatus for producing an optical fiber preform by utilizing an outside-surface coating process in the present invention.

FIG. 5 shows another embodiment of the apparatus for producing an optical fiber preform (by a coating process) according to the present invention.

The embodiment shown in FIG. 5 has the same structure as that of the embodiment shown in FIG. 4, except that, instead of the spraying-type coating means 32 movable in the direction of an axis as in FIG. 4, a brush-type coating means (a brush) 32a movable in the axis direction of the rod member 31 is used so that a desired coating layer may be deposited onto a surface of the rod member 31.

In the present invention (FIG. 4, FIG. 5, etc.), the above-mentioned drying operation may be conducted simultaneously with the coating operation (or in interlocking or coordination with the coating), or, as desired, it is also possible to conduct the coating and drying operations alternately.

Figure 7:
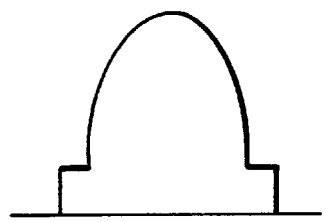
FIG. 7 is a schematic view showing a GI-type refractive index distribution of the preform shown in FIG. 6.
Figure 8:
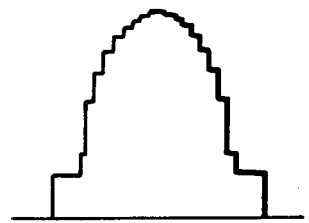
FIG. 8 is a schematic view showing a quasi-GI type refractive index distribution.
Figure 6:
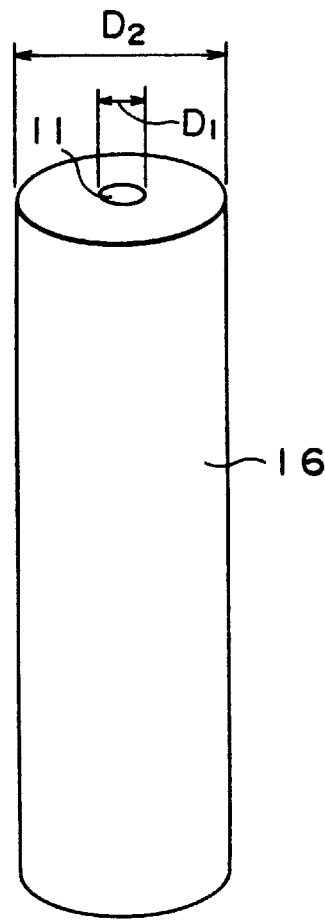
FIG. 6 is a schematic perspective view showing the structure of an optical fiber preform obtainable by the present invention.

FIG. 6 is a schematic perspective view showing a plastic optical fiber preform obtainable by the present invention. FIG. 7 is a view showing a GI-type refractive index distribution (while FIG. 8 shows a quasi-GI type refractive index distribution) of such a preform.

In the present invention, as shown in FIG. 6, the diameter $D_1$ of the rod member (starting rod) 11 may preferably be 20% or less, more preferably 15% or less (particularly preferably, 10% or less) of the diameter $D_2$ of a preform to be finally produced, in view of easy provision of a desired GI-type distribution.

FIGS. 9–12 schematically show an example of the coating process (cast coating process), which is different from spray coating or brush coating. In FIGS. 9–12, reference numeral 51 denotes a starting rod, numeral 52 denotes a coating tank, numeral 53 denotes a dryer, and numeral 54 denotes a pipe for supplying a coating solution, respectively.

Figure 18:
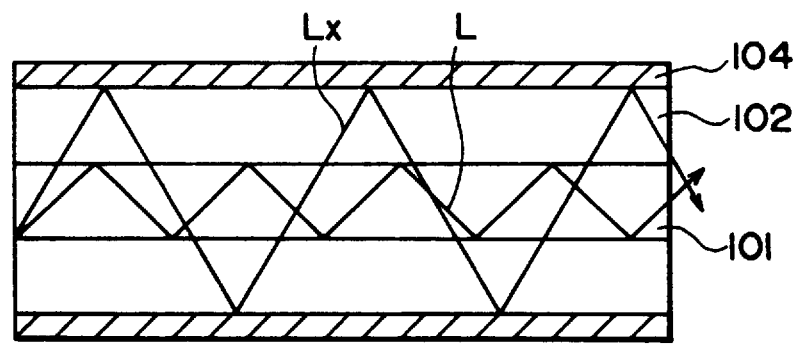
FIG. 18 is a schematic cross-sectional view showing an example of optical transmission in the optical fiber shown in FIG. 17.
Figure 19:
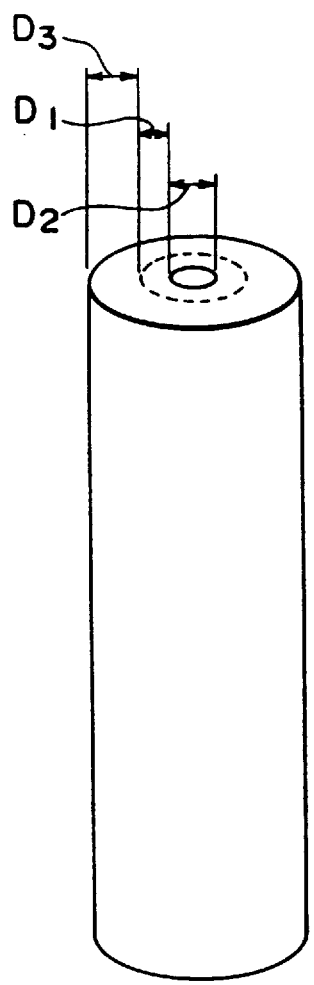
FIG. 19 is a schematic perspective view showing a relationship among a cladding layer (layer thickness: $D_1$), a core (diameter: $D_2$), and a jacket layer (layer thickness: $D_3$).

Referring to FIG. 9, the starting rod 51 is immersed in the coating tank 52 and then pulled up (FIG. 17 and FIG. 18), and thereafter the resultant product is subjected to drying by use of the dryer 53 (FIG. 19). Then, the above steps are treated or considered as one cycle, and while supplying a refractive index-adjusting raw material through the coating solution-supplying pipe 54 for every cycle so as to gradually or sequentially change the concentration of a refractive index-adjusting raw material in the coating tank 52, such a casting operation is repeated, thereby to form a cladding layer. Through such a procedure, there is formed a preform for plastic optical fiber 16 having a GI-type distribution as shown in FIG. 7 (or FIG. 8) wherein the refractive index is gradually decreased from the center of the preform toward the outer periphery thereof.

In the production process shown in the above FIGS. 9–12, the number of the repetitive coating or casting may be as large as possible, in view of the provision of a more precise GI-type distribution. More specifically, the number of the repetitive coating may preferably be 20 or more, more preferably 50 or more (particularly preferably, 100 or more), in view of the provision of a refractive index distribution having a good transmission property without conducting an after- or post-treatment such as diffusion to be conducted after the formation of a deposition layer by coating. As described above, the number of the repetitive coating operation may preferably be as large as possible, in view of the provision of a precise refractive index distribution. On the other hand, the number of the repetitive coating operation may preferably be 1000 or less (more preferably, 200 or less) in view of the length of time required for the preform formation or the efficiency in the mass-production thereof.

In the present invention, it is possible to control the number of the repetitive coating operation by simply changing a gradient or rate in the refractive index regulation for every repetitive operation, in a case where the outer diameter of a preform to be finally provided may be selected arbitrarily or optionally.

On the other hand, in a case where the outer diameter of the preform has a certain limitation, it is also possible to control the outer diameter of a preform to be finally provided, by regulating the viscosity of a coating liquid, e.g., on the basis of the amount of a solvent to be contained in the coating liquid. In other words, in general, as the viscosity of the coating liquid is decreased, the resultant amount of the coating substance to be actually attached to a workpiece to be coated per one coating operation (i.e., the thickness of a deposition layer per one coating operation) is decreased. Accordingly, in such a case, the number of the coating operations may be increased, even when the outer diameter of the preform is the constant.

(Fiber drawing process)

Figure 13:
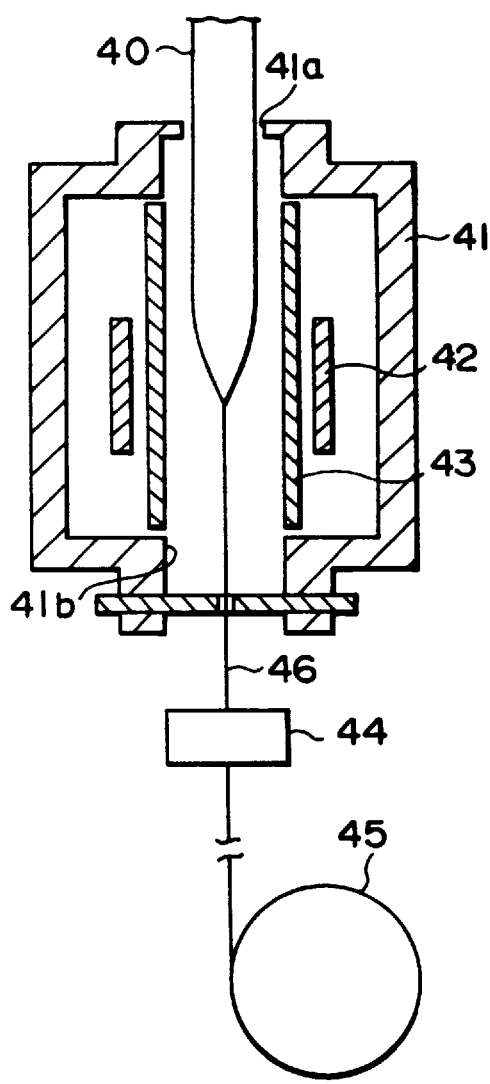
FIG. 13 is a schematic sectional view showing an embodiment of the structure of a fiber drawing furnace for drawing an optical fiber preform in the process according to the present invention.

Next, there is described a process for drawing an optical fiber preform into an optical fiber with reference to a schematic cross sectional view of FIG. 13. FIG. 13 is a schematic sectional view showing an apparatus for forming a plastic optical fiber by fiber drawing.

Referring to FIG. 13, a heater 42 and a core tube 43 are provided in the inside of the main body 41 of a fiber drawing furnace. When such a fiber drawing apparatus is used, a resin base material (preform) 40 for optical fiber is inserted into an upper opening 41a in the furnace main body 41, and melted under heating in the heating furnace 41, to be drawn or spun into a plastic optical fiber 46 having a predetermined outer diameter. The plastic optical fiber 46 thus drawn is pulled out through a lower opening 41b of the furnace 41, and then the plastic optical fiber 46 is wound up by use of a winding-up device 45 while the outer diameter of the resultant optical fiber 46 is measured by means of an outer diameter-measuring device (monitor) 44.

As the above-mentioned preform 40, one having a GI-type refractive index distribution in the core and cladding layer may preferably be used. In such a fiber drawing method, for example, it is preferred to use a preform 40 which has been prepared by using a polymethyl methacrylate (PMMA) excellent in optical transparency for a cladding and using a compound having a higher refractive index for the core. In this case, the compound having a higher refractive index to be added to the core, and the outer diameter or the length of the preform are not particularly restricted.

It is preferred to apply a drawing tension of 10 g or more to the preform (base material) 40 comprising a polymer during a period of time of from the heating thereof based on the heating furnace 41 to the winding-up thereof by the winding-up device 45. When the degree of orientation in a polymer is low, the molecules constituting the resultant polymer product assumes a randomly-oriented structure, and therefore the strength thereof is weak under stretching. In contrast thereto, according to the present inventors' knowledge, when the drawing tension is 10 g or more, the molecules are oriented along the longitudinal direction of the resultant fiber, whereby the tensile strength of the fiber may be improved and the long-term reliability thereof may be assured.

On the other hand, the above drawing tension may preferably be 100 g or less. When the drawing tension exceeds 100 g, the resultant fiber is liable-to cause shrinkage under the action of heat. According to the present inventors' knowledge, the reason for the occurrence of such a Phenomenon may be considered as follows:

Thus, when the polymer constituting the cladding layer of an optical fiber is considerably oriented under the action of a drawing tension larger than 100 g, the fiber will be wound up around a reel, etc., in such a state that the cladding is so oriented. As a result, when the polymer constituting the cladding is supplied with heat, it is presumed that shrinkage occurs on the basis of the recovery of the polymer to its original state.

In a case where the cladding is shrunk in such a manner, according to the present inventors' knowledge, it is presumed that the optical fiber per se is also shrunk and a strain is applied to the optical fiber in the longitudinal direction thereof to cause a structure defect of the fiber per se thereby to increase the transmission loss.

Accordingly, in the present invention, it is preferred to employ a drawing tension of 100 g or less to prevent the considerable orientation of the polymer constituting the cladding.

According to the present inventors' knowledge, when the above-mentioned preform 40 is melted under heating to be spun, the outer diameter of the optical fiber 46 may preferably be 1000 $\mu$m or less. In a case where the outer diameter exceeds 1000 $\mu$m, a decrease in the strength is not observed even when the degree of orientation of molecules is low. On the other hand, in a case where the outer diameter is 1000 $\mu$m or less, a decrease in the strength is considerable when the degree of orientation of molecules is low. However, as described above, in a case where the drawing tension is set to be 10 g or more, the tensile strength of the fiber 46 is improved on the basis of the orientation of molecules along the longitudinal direction of the fiber thereby to assure long-term reliability, even when the outer diameter of optical fiber 46 is set to 1000 $\mu$m or less.

(Optical fiber preform)

The plastic optical fiber preform obtained by the production process according to the present invention as described above generally has a rod-like shape comprising a core and a cladding layer. In the present invention, it is preferred that a jacket layer is further formed as desired on the outer circumference of the rod comprising the core and the cladding layer, and the jacket layer comprises a material having substantially the same quality as that of an organic polymer constituting the cladding layer and having a lower purity than that of the organic polymer constituting the cladding layer.

In such an embodiment, the material constituting the jacket layer may preferably be such a polymer $B_1$ which has the same quality as that of the polymer B constituting the cladding layer and has a lower purity than that of the polymer B. Herein, "the same quality" means that the monomer constituting the material for the jacket layer is substantially common with the monomer constituting the polymer B for the cladding layer. More specifically, at least 90 mol % (more preferably, at least 95 mol %) of the monomer constituting the jacket layer is the same as the monomer constituting the polymer B for the cladding layer.

In the case of a copolymer, when the common monomers in the jacket layer and the cladding layer are respectively denoted by $M_1$ and $M_2$, the monomer constitution of the cladding layer is denoted by $\{M_1\ (a_1\ mol)+M_2\ (b_1\ mol)\}$, and the monomer constitution of the jacket layer is denoted by $\{M_1\ (a_2\ Mol)+M_2\ (b_2\ Mol)\}$ (provided that $a_1 \leq a_2$ and $b_1 \leq b_2$), the value of $(a_2+b_2)/(_1+b_1)$ may preferably be at least 90 mol % (more preferably, at least 95 mol %).

Since the polymer B constituting the cladding layer has a high purity and contributes to light transmission, a polymer having a purity of at least 99% may preferably be used as the polymer B constituting the cladding layer. On the other hand, since the polymer $B_1$ constituting the jacket layer does not directly contribute to light transmission, a polymer having a purity of not more than 99% may preferably be used in view of cost, etc. The polymer $B_1$ may preferably have a purity of at least about 80% (more preferably, at least about 90%) in view of the adhesive property thereof with the cladding. However, this "purity" is used in a manner such that an impurity not contributing to light transmission at all (polymerization inhibitor, etc.) is excluded from the consideration of the purity. Accordingly, a component which contributes to light transmission (for example, a material to be added so as to change the refractive index) is not considered as an "impurity" relating to the evaluation of the above-mentioned purity.

As described above, in a case where a material having a low purity is used for the jacket layer, a material having a low cost (for example, a commercially available and inexpensive polymer) can be used for the jacket layer, and therefore a plastic optical fiber having a low cost but having a good transmission property may be provided even when the outer diameter of the fiber is increased.

In the present invention, it is further preferred that the material constituting the jacket layer is one having the same quality as both of the core and the cladding, in consideration of the adhesion between the cladding and the core. More specifically, in such an embodiment, a material comprising at least 90% (more preferably, at least 95%) of the component (monomer, etc.) for the core material may preferably be used as the material constituting the jacket layer. On the other hand, in view of the production cost, a material comprising 99% or less of the component (monomer, etc.) for the core material may preferably be used as the material constituting the jacket layer.

Here, when a material having the same quality as those for the core and cladding layer is used as the material constituting the jacket layer, as compared with a case wherein the jacket layer is formed by using another material of different quality, the handling property at a working site, etc., may be improved and simultaneous peeling of the jacket layer may be effectively prevented in the peeling-off of a resin layer (an outermost layer 104 in FIG. 10 as described below).

The material constituting the jacket layer may preferably have a melting point which is substantially equal to that of the core material. More specifically, when the melting point of the material for the jacket layer is denoted by $m_j$ and the melting point of the core material is denoted by $m_c$, $|m_j-m_c|$ (absolute value) may preferably be not more than 10° C. (i.e., the value of $(m_j-m_c)$ may preferably be within ±10° C.).

When a material having a melting point substantially different from that of the core material is used as the material constituting the jacket layer, the cladding layer and the jacket layer are liable to be melted nonuniformly (to be melted separately) at the time of the melting of the preform during a fiber drawing operation.

Figure 14:
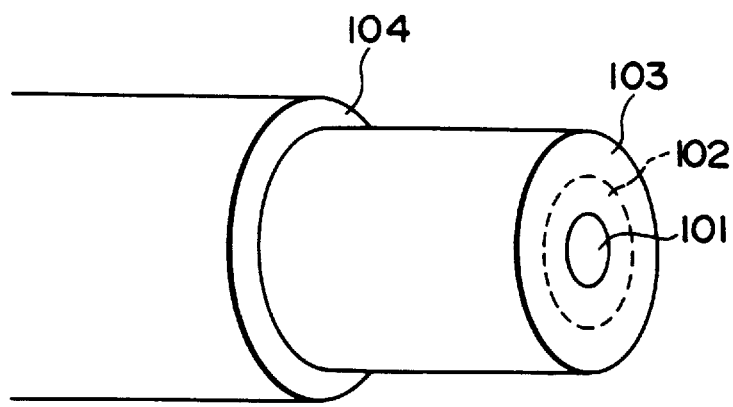
FIG. 14 is a schematic perspective view showing an example of the structure of an optical fiber having a jacket layer.

FIG. 14 is a schematic perspective view showing an embodiment of the structure of an optical fiber which has been formed by forming a preform, coating the preform with a resin layer, and further subjecting the resultant preform to fiber drawing. Referring to FIG. 14, the optical fiber in this embodiment comprises a core 101, a cladding layer 102 comprising a high-purity polymer and located on the outer circumference of the core 101, and a jacket layer 103 comprising a low-purity polymer and located on the outer circumference of the cladding layer 102.

When the jacket layer 102 is formed on the circumference of the cladding layer in the state of the preform in the above-mentioned manner, the jacket layer is simultaneously formed in the melt-drawing of the preform. Accordingly, in such an embodiment, it is not necessary to form the jacket layer by coating after the drawing, and therefore the resultant productivity is markedly improved.

Further, an outermost layer of resin layer 104 may be formed as desired on the circumference of the jacket layer 103, for the purpose of discrimination, etc. In such a case, in the present invention, it is not necessarily required to impart a function as a protecting layer to the resin layer 104, and therefore a resin which is more inexpensive as compared with that in a conventional case can be used as the material for the resin layer 104. In addition, there is a further advantage that the resin layer 104 can be made thinner.

In general, when a connector is mounted to an optical fiber for the purpose of connection, it is necessary to remove the resin layer 104 from the plastic optical fiber. However, when the fiber per se has the jacket layer 103 as in the plastic optical fiber produced according to the present invention, the fiber can maintain sufficient strength even after the removal of the resin layer 104 therefrom, and therefore such a fiber has an advantage that good strength may be maintained even in the connector portion.

In general, connecting means such as connectors are standardized in most cases. In the case of a conventional optical fiber, the main body outer diameter of which has been simply increased, it is required that even the neighborhood of the outer periphery of the fiber not contributing to transmission is constituted by using a material having a high purity, for the purpose of meeting the standard, and therefore the resultant production cost is markedly increased. In contrast thereto, according to the present invention, the production cost can be reduced by forming the jacket layer 103 having a low purity The process according to the present invention is particularly suitable for a case in which the plastic optical fiber to be produced is a GI-type plastic optical fiber.

More specifically, in the production of an SI-type plastic optical fiber, the fiber is generally produced by pull down a liquefied core material due to melting in most cases. On the other hand, generally in the production of a GI-type plastic optical fiber, a preform having a refractive index distribution is first prepared and the preform is drawn into a fiber, as disclosed in Japanese Patent Publication No. 5857/1977

(Sho 52-5857). Accordingly, the present invention has an advantage that the production of the a preform with a jacket is facilitated by conducting a jacketing step in series at the time of the formation of the GI-type preform.

It is also possible to incorporate a functional material having each of various functions, such as anti-oxidant, light absorbing agent and light-scattering agent, so as to cause the functional material to exhibit its function. These functional materials can be added to the jacket layer singly or in combination of at least two species thereof.

More specifically, for example, when an anti-oxidant (such as hindered phenol, hindered amine, aryl amine, phosphite, and thioether) is incorporated into the jacket layer, it is possible to cause such a component to exhibit a function of preventing opacification and of preventing coloring.

Figure 15:
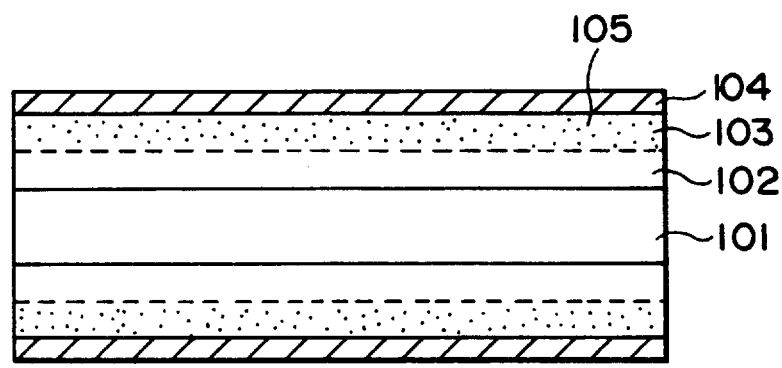
FIG. 15 is a schematic cross-sectional view showing an example of the structure of an optical fiber having a jacket layer.
Figure 16:
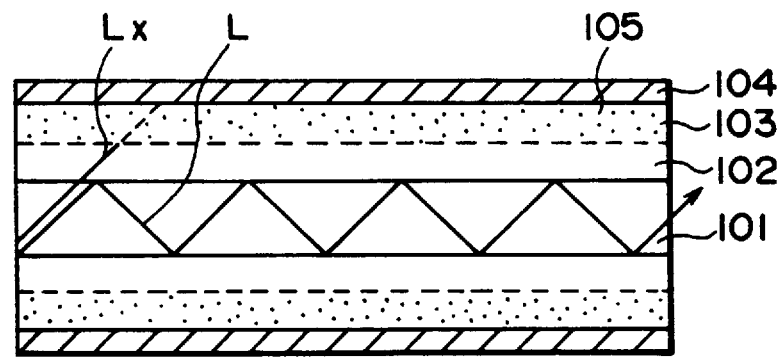
FIG. 16 is a schematic cross-sectional view showing an example of optical transmission in the optical fiber shown in FIG. 15.
Figure 17:
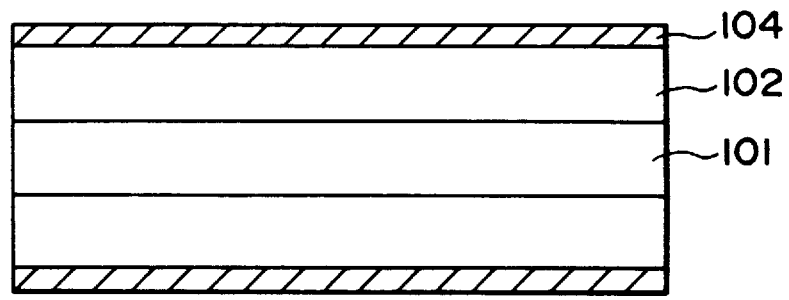
FIG. 17 is a schematic cross-sectional view showing an example of the structure of an optical fiber not having a jacket layer.

Further, as shown in FIGS. 15 and 16, when a light absorbing agent 105 (such as benzotriazole, benzophenone, benzoate, and cyanoacrylate) is incorporated into the jacket layer 103 to be formed on the circumference of the core 101 and the cladding layer 102, stray light $L_x$ (FIG. 18), which can propagate in the cladding layer 102 when propagating light L is incident to an optical fiber having the structure as shown in FIG. 17, can be effectively absorbed.

Further, a light-scattering agent such as $TiO_2$ powder may be incorporated into the jacket layer 103 so as to exhibit its light-scattering function.

As shown in FIG. 19, the thickness $D_1$ of the cladding layer in the plastic optical fiber preform to be produced according to the present invention may preferably be not less than 10% and not more than 40% of the diameter $D_2$ of the core. Further, the thickness $D_3$ of the jacket layer may preferably be greater than the thickness $D_1$ of the cladding layer. When $D_1$ is less than 10% of $D_2$, a part of light for communication also propagates in the jacket layer having a low transparency, so that the transmission performance can be lowered. Most of light for communication propagates in the core but a part of the light for communication spreads to the outside of the core so as to propagate in such a portion. Accordingly, the cladding may preferably has a thickness larger than that of the core to a certain extent.

On the other hand, when $D_1$ exceeds 40% of $D_2$, an expensive material for cladding is also used for a region which does not contribute to the propagation of communication light at all, and therefore such a case is not preferred in view of the production cost.

In the optical fiber preform provided with the jacket layer in such a manner, it is preferred that a GI-type refractive index distribution is formed so that the refractive index is gradually decreased from the center of the optical fiber preform toward the outer periphery thereof, as shown in FIG. 16. The process for producing such an optical fiber preform is not particularly restricted, but it is preferred to use an outside-surface CVD process or an outside-surface coating process (such as spray coating process as described above may preferably be used. When a coating process is used, a drying operation may be conducted simultaneously with the coating operation, or the coating and drying operations may be conducted alternately.

Then, the optical fiber preform thus obtained may be subjected to an ordinary fiber drawing procedure (e.g., an operation wherein the optical fiber preform is melted under heating while the preform is vertically maintained), thereby to obtain a desired plastic optical fiber.

There is described an embodiment of the process for producing the above-mentioned preform for plastic optical fiber (provided with a jacket layer) with reference to schematic perspective views of FIGS. 9–12.

FIGS. 9–12 schematically show an example of the coating process (cast coating process), which is different from spray coating or brush coating.

Figure 20:
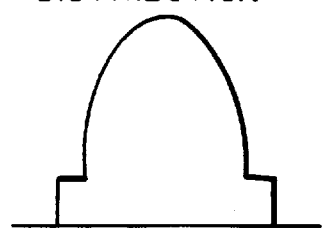
FIG. 20 is a schematic view showing a GI-type refractive index distribution in the optical fiber shown in FIG. 19.

Referring to FIG. 9, the starting rod 51 is immersed in the coating tank 52 and then pulled up (FIG. 9 and FIG. 10), and thereafter the resultant product is subjected to drying by use of the dryer 53 (FIG. 11). Then, the above steps are treated or considered as one cycle, and while supplying a refractive index-adjusting raw material through the coating solution-supplying pipe 54 for every cycle so as to gradually or sequentially change the concentration of a refractive index-adjusting raw material in the coating tank 52, such a casting operation is repeated, thereby to form a cladding layer. Then, the raw material to be used is replaced with one having a lower purity, and a jacket layer is formed by using such a material. Through such a procedure, there is formed a preform for plastic optical fiber having a jacket layer and having a GI-type distribution as shown in FIG. 20 wherein the refractive index is gradually decreased from the center of the preform toward the outer periphery thereof.

Hereinbelow, the present invention will be described in further detail.

EXAMPLE 1

(Production of fiber preform by CVD process)

Referring to FIG. 1, polymethyl methacrylate (PMMA; refractive index $N_3$=1.490) was used as a transparent polymer A, and a rod member 11 comprising the polymer A as a main component was formed.

The above polymer A (PMMA) was dissolved in a solvent (tetrahydrofuran: THF) in a predetermined ratio (concentration: about 30 wt. %) and the resultant solution was poured into a supply tank 14. On the other hand, hexyl acetate as a refractive index modifier C having a refractive index (refractive index $N_c$=1.408) lower than that of the polymer A was dissolved in THF (concentration: about 30 wt. %) to obtain a solution, and the resultant solution was placed in a refractive index modifier tank 15.

The rod member 11 obtained by the above-mentioned procedure was mounted to an unshown rotating device and the vapor of a raw material was uniformly supplied from the supply tank 14 onto the surface of the rod member along the axis direction thereof, by use of a nozzle 12.

In the above-mentioned supply of the vapor, the refractive index modifier C was gradually fed (flow rate: about 10 ml/min) from the refractive index modifier tank 15 into the supply tank 14, so that the mixing ratio of the refractive index modifier C was increased at every vapor-supplying operation to sequentially increase the refractive index of the deposition layer based on the vapor. As a result, there was obtained a plastic optical fiber preform 21 (FIG. 2) having a GI-type refractive index distribution in which the refractive index was gradually decreased from the center of the preform toward the outer periphery thereof (as shown in FIG. 3).

EXAMPLE 2

Referring to FIG. 1, polymethyl methacrylate (PMMA; refractive index $N_3$=1.492) was used as a transparent polymer A and butyl benzyl phthalate having a refractive index (refractive index $N_b$=1.536) lower than the refractive index ($N_a$) of the polymer A was used as a refractive index modifier B. These two components were mixed (mixing ratio=about 4:1) to prepare an initial solution for providing a refractive index of 1.507. The mixture solution was dissolved in a solvent (tetrahydrofuran: THF) in a concentration of about 30 wt. %, and the resultant solution was poured into a supply tank 14.

Further, a rod member 11 (refractive index: 1.507) was prepared by using a mixture solution having the same composition as that of the above solution, as a main component. On the other hand, the above polymer A was dissolved in THF (concentration: about 30 wt. %) to obtain a solution, and the resultant solution was stored in a refractive index modifier tank 15.

The rod member 11 thus obtained was mounted to an unshown rotating device and the vapor of a raw material was directly supplied from the supply tank 14 onto the surface of the rod member 11 through a nozzle 12 to be deposited thereon.

In the above deposition, the raw material A was gradually fed from the refractive index modifier tank 15 into the supply tank 14, so that the mixing ratio of the raw material A was increased at every deposition operation to gradually increase the refractive index of the deposition layer based on the vapor. As a result, there was obtained a plastic optical fiber preform 21 (FIG. 2) having a GI-type refractive index distribution in which the refractive index was gradually decreased from the center of the preform toward the outer periphery thereof (as shown in FIG. 3).

<Evaluation of transmission property>

Each of the preforms obtained in above Examples 1 and 2 was drawn under melting by a conventional drawing process to prepare an all-plastic optical fiber (APF) having a diameter of 1 mm and a length of 100 m. Each of these fibers was evaluated with respect to transmission loss and band at a wavelength of 0.658 $\mu$m. The thus obtained evaluation results are shown in the following table (Table 1).

In this evaluation, a laser diode (LD) having a wavelength of 0.658 $\mu$m was used as a light source for measurement of both the transmission loss and the band. Further, the band was measured by use of an FFT type optical oscilloscope (manufactured by Hamamatsu Photonics k.k.) while pulses with a half-value width of 60 psec were generated in the light source.

TABLE 1

|  | <Example 1> | <Example 2> |
| --- | --- | --- |
| Transmission loss (dB/km) | 100 | 120 |
| Transmission band (MHz · km) | 800 | 800 |

EXAMPLE 3
(Production of fiber preform by outside-surface CVD)

Referring to FIG. 1, a rod member 11 of PMMA having an inner diameter of 5 mm and a length of 1 m (containing butyl benzyl phthalate mixed therein; refractive index=about 1.55) was provided, and a glass pipe having a nozzle with an inner diameter of 1 mm was located outside of the PMMA rod member.

While the above PMMA rod member 11 was rotated (at a rotational speed of about ten rotations per minute), a mixture vapor comprising methyl methacrylate (MMA), an initiator (benzil methyl ketal, concentration=3%) and butyl benzyl phthalate ester (initial concentration=30%) was supplied to the outside surface of the rod member 11, and heating to 100° C. was conducted simultaneously.

Figure 21:
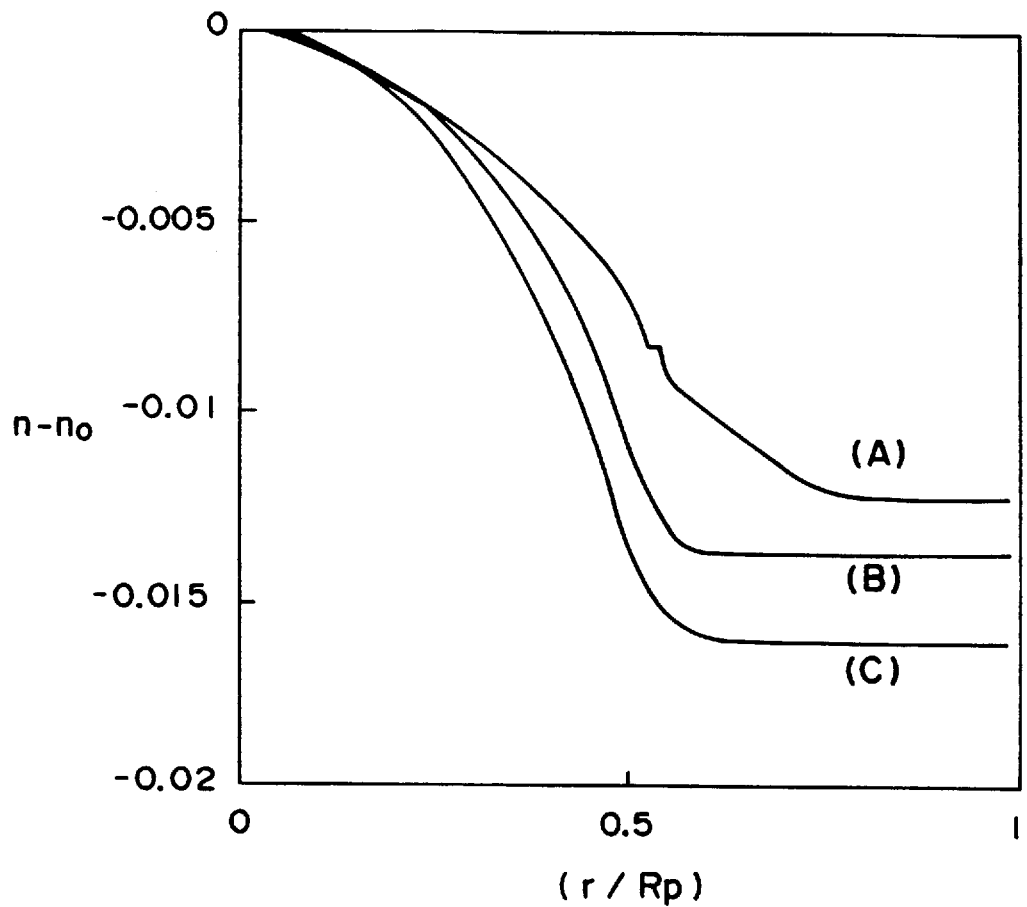
FIG. 21 is a graph showing a refractive index distribution of each of the optical fibers obtained in Examples 3, 9 and 10.

Through the above procedure, a cladding layer (thickness: 5 mm) was formed on the basis of the polymerization of the above-mentioned MMA. When the above deposition and heating operations were repeated, there was finally obtained a base material (preform) having a diameter of 50 mm and a refractive index distribution shown in FIG. 21. In FIG. 21, the abscissa (r/Rp) represents a distance from the core center (in terms of a relative value with respect to "25 mm"=1 (one) unit) and the ordinate (n-n$_0$) represents a relative refractive index difference with respect to the refractive index of the cladding. In the graph of FIG. 21, the curve A shows the refractive index distribution of a preform in which a mixing ratio in the neighborhood of the core center is MMA/BBP= 7/1, the curve B shows the refractive index distribution of a preform in which the mixing ratio in the neighborhood of the core center is MMA/BBP=6/1, and the curve C shows a refractive index distribution of a preform in which the mixing ratio in the neighborhood of the core center is MMA/BBP=5/1.

EXAMPLE 4
(Production of fiber preform by coating process)

Referring to FIG. 4, polymethyl methacrylate (PMMA; refractive index N$_3$=1.490) was used as a transparent polymer A to form a rod member 31 mainly comprising the polymer A.

The polymer A (PMMA) was dissolved in a solvent (tetrahydrofuran: THF) in a predetermined ratio (concentration: about 30 wt. %) and the resultant solution was poured into a supply tank 34. On the other hand, hexyl acetate as a refractive index modifier C having a refractive index (refractive index N$_c$=1.408) lower than that of the polymer A was dissolved in THF (concentration: about 30 wt. %) to obtain a solution, and the resultant solution was stored in a refractive index modifier tank 35.

The rod member 31 obtained by the above procedure was mounted to an unshown rotating device and the solution of raw material from the supply tank 14 was sprayed uniformly on the surface of the rod member along the axis direction thereof, by use of a nozzle 32.

In the above spraying operation, the refractive index modifier C was gradually fed (flow rate: about 10 ml/min) from the refractive index modifier tank 35 into the supply tank 34, so that the mixing ratio of the refractive index modifier C was increased at every spraying operation to decrease the refractive index of the spraying solution. When such an operation was repeated 100 times, there was obtained a plastic optical fiber preform 21 (FIG. 6) having a GI-type refractive index distribution in which the refractive index was gradually decreased from the center of the preform toward the outer periphery thereof (as shown in FIG. 7).

EXAMPLE 5

Referring to FIG. 4, polymethyl methacrylate (PMMA; refractive index N$_a$=1.492) was used as a transparent polymer A, and butyl benzyl phthalate ester having a refractive index (refractive index N$_b$=1.536) higher than the refractive index (N$_a$) of the polymer A was used as a refractive index modifier B. By use of these two components as main components, a starting rod 31 (refractive index=1.507) was prepared.

A mixture solution (mixing ratio=4:1, refractive index= 1.507) which had been used for the formation of the starting rod and comprised the polymer A (PMMA) and the refractive index modifier B was dissolved in a solvent (tetrahydrofuran: THF) was poured into a supply tank 34. On the other hand, the polymer A was dissolved in THF (concentration: 30%) and the resultant solution was stored in the refractive index modifier tank 35.

The rod member 31 thus obtained was mounted to an unshown rotating device and the raw material from the supply tank 34 was sprayed uniformly onto the outside surface of the rod member 31 along the axis direction thereof, by use of the spraying device 32.

At the time of the spraying operation, the raw material A was gradually fed from the refractive index modifier tank 35 into the supply tank 34, so that the mixing ratio of the raw material A was increased at every spraying operation to gradually decrease the refractive index of the spraying solution. When this operation was repeated 100 times, there was obtained a plastic optical fiber preform 16 (FIG. 6) having a GI-type refractive index distribution in which the refractive index was gradually decreased from the center of the preform toward the outer periphery thereof (as shown in FIG. 7).

EXAMPLE 6

Referring to FIG. 4, benzyl methacrylate having a refractive index (refractive index $N_b$=1.568) higher than the refractive index ($N_a$) of the polymer A was used as a refractive index modifier B. These two components were mixed (mixing ratio=4:1) to prepare an initial solution, and the resultant solution was dissolved in a solvent (tetrahydrofuran; THF) in a concentration of 30 wt. % and was poured into the supply tank 34.

Separately, a rod member 31 (refractive index: 1.55) was prepared by using a copolymer of MMA-benzyl methacrylate as a main component. On the other hand, the polymer A was dissolved in THF (concentration: about 30%) and was stored in the refractive index modifier tank 35.

The rod member 31 thus obtained was mounted to an unshown rotating device and the raw material from the supply tank 34 was sprayed uniformly onto the surface of the rod member 31 along the axis direction thereof, by use of the nozzle 32.

At the time of the spraying operation, the raw material A was gradually fed from the refractive index modifier tank 35 into the supply tank 34, so that the mixing ratio of the raw material A was increased at every spraying operation to gradually increase the refractive index of the spraying solution. When this operation was repeated 100 times, there was obtained a plastic optical fiber preform 16 (FIG. 6) having a GI-type refractive index distribution in which the refractive index was gradually decreased from the center of the preform toward the outer periphery thereof (as shown in FIG. 7).

EXAMPLE 7

Preforms were prepared under the same conditions as in Example 6, except that the above-mentioned control of the refractive index was effected at every (8–20)th (eighth to twentieth) coating operation thereby to form a stepped-type refractive index distribution comprising nine steps.

EXAMPLE 8

Preforms were prepared under the same conditions as in Example 7 and were heat-treated at 80° C. for 20 hours in an atmosphere of nitrogen.

<Evaluation of transmission property>

Each of the preforms obtained in above Examples 4 to 85 was drawn under melting by a conventional drawing process to prepare an all-plastic optical fiber (APF) having a diameter of 1 mm and a length of 100 m. Each of these fibers was evaluated with respect to transmission loss and band at a wavelength of 0.658 μm. The thus obtained evaluation results are shown in the following table (Table 2).

In this evaluation, a laser diode (LD) having a wavelength of 0.658 μm was used as a light source for measurement of both the transmission loss and the band. Further, the band was measured by use of an FFT type optical oscilloscope (manufactured by Hamamatsu Photonics k.k.) while pulses with a half-value width of 60 psec were generated in the light source.

TABLE 2

|  | <Example 4> | <Example 5> | <Example 6> |
|---|---|---|---|
| Transmission loss (dB/km) | 100 | 120 | 180 |
| Transmission band (MHz · km) | 800 | 800 | 700 |

|  | <Example 7> | <Example 8> |
|---|---|---|
| Transmission loss (dB/km) | 180 | 150 |
| Transmission band (MHz · km) | 100 | 200 |

As shown in the above Table 2, since a precise GI-type refractive index distribution may be imparted to an optical fiber according to the present invention, it is easy to obtain an optical fiber which has a good transmission and band property, and is capable of transmitting a large quantity of information.

EXAMPLE 9

(Production of fiber preform by spray coating process)

Referring to FIG. 4, a rod member 31 (material: PMMA) having an outer diameter of 5 mm and a length of 1 m was provided, and was used as a starting rod 31.

The polymer A (PMMA) was dissolved in a solvent (tetrahydrofuran; THF) in a predetermined ratio (concentration: about 30 wt. %) and was poured into the supply tank 34. On the other hand, as a refractive index modifier C, hexyl acetate having a refractive index (refractive index $N_c$=1.408) lower than that of the polymer A was dissolved in THF and stored in the refractive index modifier tank 35.

While the above PMMA rod member 11 was mounted to an unshown rotating device and was rotated at a rotational speed of ten rotations per minute, the raw material solution from the supply tank 34 was uniformly sprayed on the outside surface of the rod member along the axis direction thereof, by use of a nozzle 32 (moving speed along the axis direction: 20 mm per minute). The surface of the rod member was heated up to about 60° C. by means of a heater so as to promote the evaporation of the solvent.

In the above spraying, the refractive index modifier C was gradually (flow rate: 10 ml/min.) supplied to the supply tank 34 so as to gradually increase the mixing ratio of the refractive index modifier C at every spraying operation to decrease the refractive index of the coating solution. When such an operation was repeated about 100 times, there was obtained a plastic optical fiber preform 16 (FIG. 6, outer diameter=50 mm) having a GI-type refractive index distribution (FIG. 7) wherein the refractive index was gradually decreased from the center of the preform toward the outer periphery thereof.

Through the above procedure, there were obtained preforms wherein the mixing ratio in the neighborhood of the core center was MMA/BBP=7/1, 6/1, and 5/1, respectively. It was found that each of the thus obtained preform had a refractive index distribution substantially comparable to what shown in the graph of FIG. 21.

EXAMPLE 10

(Production of fiber preform by brush coating process)

Referring to FIG. 5, a rod member 31 (material: PMMA) having an outer diameter of 5 mm and a length of 1 m was provided, and was used as a starting rod 31.

The polymer A (PMMA) was dissolved in a solvent (tetrahydrofuran; THF) in a predetermined ratio (concentration: about 30 wt. %) and was poured into the supply tank 34. On the other hand, as a refractive index modifier C, hexyl acetate having a refractive index (refractive index $N_c$=1.408) lower than that of the polymer A was dissolved in THF and stored in the refractive index modifier tank 35.

While the above PMMA rod member 11 was mounted to an unshown rotating device and was rotated at a rotational speed of ten rotations per minute, the raw material solution from the supply tank 34 was uniformaly applied onto the outside surface of the rod member 31 along the axis direction thereof, by use of a brush 32a (moving speed along the axis direction: 20 mm per minute). The surface of the rod member was heated up to about 60° C. by means of a heater so as to promote the evaporation of the solvent.

In the above spraying, the refractive index modifier C was gradually (flow rate: 10 ml/min.) supplied to the supply tank 34 so as to gradually increase the mixing ratio of the refractive index modifier C at every spraying operation to decrease the refractive index of the spraying solution. When such an operation was repeated about 100 times, there was obtained a plastic optical fiber preform 16 (FIG. 6, outer diameter=50 mm) having a GI-type refractive index distribution (FIG. 7) wherein the refractive index was gradually decreased from the center of the preform toward the outer periphery thereof.

Through the above procedure, there were obtained preforms wherein the mixing ratio in the neighborhood of the core center was MMA/BBP=7/1, 6/1, and 5/1, respectively. It was found that each of the thus obtained preform had a refractive index distribution substantially comparable to that shown in the graph of FIG. 21.

EXAMPLE 11

By use of a fiber drawing apparatus as shown in FIG. 13, a plastic optical fiber preform 40 provided with a GI-type refractive index distribution was subjected to a fiber drawing operation.

More specifically, the above preform 40 was inserted into a fiber drawing furnace 41 in which the temperature in the core tube was set to 240° C., and was subjected to fiber drawing at a linear velocity of 2 m/min so as to provide a center value of the resultant outer diameter of 650 μm. The drawing tension used herein was 20 g.

When the tensile strength of the thus prepared fiber 46 was measured, it was found to be 2.3 Kg/mm$^2$. When a length of 1 m of the fiber was wound up with a tension of 50 g around a mandrel having a diameter of 10 mm, the period of time until the breakage thereof was 10 days.

EXAMPLE 14

Referring to FIG. 13, a plastic optical fiber preform 40 provided with a GI-type refractive index distribution was provided and was inserted into a fiber drawing furnace 41 in which the temperature in the core tube was set to 230° C., and was subjected to fiber drawing at a linear velocity of 2 m/min so as to provide a center value of the resultant outer diameter of 650 μm. The drawing tension used herein was 40 g.

When the tensile strength of the thus prepared fiber 46 was measured, it was found to be 2.4 Kg/mm$^2$. When a length of 1 m of the fiber was wound up with a tension of 50 g around a mandrel having a diameter of 10 mm, the period of time until the breakage thereof was 12 days.

EXAMPLE 15

Referring to FIG. 13, a plastic optical fiber preform 40 provided with a GI-type refractive index distribution was provided and was inserted into a fiber drawing furnace 41 in which the temperature in the core tube was set to 250° C., and was subjected to fiber drawing at a linear velocity of 2 m/min so as to provide a center value of the resultant outer diameter of 650 μm. The drawing tension used herein was 15 g.

When the tensile strength of the thus prepared fiber 46 was measured, it was found to be 2.3 Kg/mm$^2$. When a length of 1 m of the fiber was wound up with a tension of 50 g around a mandrel having a diameter of 10 mm, the period of time until the breakage thereof was 8 days.

Comparative Example 1

Referring to FIG. 13, a plastic optical fiber preform 40 provided with a GI-type refractive index distribution was provided and was inserted into a fiber drawing furnace 41 in which the temperature in the core tube was set to 260° C., and was subjected to fiber drawing at a linear velocity of 2 m/min so as to provide a center value of the resultant outer diameter of 650 μm. The drawing tension used herein was 8 g.

When the tensile strength of the thus prepared fiber 46 was measured, it was found to be 1.5 Kg/mm$^2$. When a length of 1 m of the fiber was wound up with a tension of 50 g around a mandrel having a diameter of 10 mm, the period of time until the breakage thereof was 10 hours.

Comparative Example 2

Referring to FIG. 13, a plastic optical fiber preform 40 provided with a GI-type refractive index distribution was provided and was inserted into a fiber drawing furnace 41 in which the temperature in the core tube was set to 260° C., and was subjected to fiber drawing at a linear velocity of 1.5 m/min so as to provide a center value of the resultant outer diameter of 650 μm. The drawing tension used herein was 6 g.

When the tensile strength of the thus prepared fiber 46 was measured, it was found to be 1.3 Kg/mm$^2$. When a length of 1 m of the fiber was wound up with a tension of 50 g around a mandrel having a diameter of 10 mm, the period of time until the breakage thereof was 8 hours.

Comparative Example 3

Referring to FIG. 13, a plastic optical fiber preform 40 provided with a GI-type refractive index distribution was provided and was inserted into a fiber drawing furnace 41 in which the temperature in the core tube was set to 270° C., and was subjected to fiber drawing at a linear velocity of 2 m/min so as to provide a center value of the resultant outer diameter of 650 μm. The drawing tension used herein was 5 g.

When the tensile strength of the thus prepared fiber 46 was measured, it was found to be 1.0 Kg/mm$^2$. When a length of 1 m of the fiber was wound up with a tension of 50 g around a mandrel having a diameter of 10 mm, the period of time until the breakage thereof was 3 hours.

Comparative Example 4

Referring to FIG. 13, a plastic optical fiber preform 40 provided with a GI-type refractive index distribution was provided and was inserted into a fiber drawing furnace 41 in which the temperature in the core tube was set to 275° C., and was subjected to fiber drawing at a linear velocity of 2 m/min so as to provide a center value of the resultant outer diameter of 1100 µm. The drawing tension used herein was 5 g.

When the tensile strength of the thus prepared fiber 46 was measured, it was found to be 2.2 Kg/mm². When a length of 1 m of the fiber was wound up with a tension of 50 g around a mandrel having a diameter of 10 mm, the period of time until the breakage thereof was 10 days, and substantially no decrease in the strength was observed.

EXAMPLE 16

Referring to FIG. 13, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 220° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 70 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day (24 hours), and then the shrinkage retention (retention in shrinkage) and transmission loss thereof were measured. As a result, they were found to be 99% and 210 dB/km, respectively. In other words, substantially no shrinkage due to heat was observed, and the fluctuation in the transmission loss was little. The results of the measurement of the transmission loss are shown in a graph of FIG. 22.

EXAMPLE 17

Referring to FIG. 13, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 220° C.

When the above preform was subjected to fiber drawing at a linear velocity of 3 m/min so as to provide a center value of the resultant outer diameter of 650 µm. The resultant fluctuation in the outer diameter was ±30 µm. At the time of the above fiber drawing operation, the drawing tension was set to 85 g.

When the transmission loss of the thus prepared GI-type plastic optical fiber 46 was measured, it was found to be 210 dB/km at a wavelength of 650 nm.

Then, the above fiber was subjected to a deterioration treatment at 80° C. for one day, and then the shrinkage retention and transmission loss thereof were measured. As a result, they were found to be 99% and 190 dB/km, respectively. In other words, substantially no shrinkage due to heat was observed, and the fluctuation in the transmission loss was little. The results of the measurement of the transmission loss are shown in a graph of FIG. 22.

EXAMPLE 18

Referring to FIG. 13, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 230° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 50 g.

When the transmission loss of the thus prepared GI-type plastic optical fiber 46 was measured, it was found to be 220 dB/km at a wavelength of 650 nm.

Then, the above fiber was subjected to a deterioration treatment at 80° C. for one day, and then the shrinkage retention and transmission loss thereof were measured. As a result, they were found to be 98% and 210 dB/km, respectively. In other words, substantially no shrinkage due to heat was observed, and the fluctuation in the transmission loss was little. The results of the measurement of the transmission loss are shown in a graph of FIG. 22.

EXAMPLE 19

Referring to FIG. 13, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 210° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 100 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day, and then the shrinkage retention and transmission loss thereof were measured. As a result, they were found to be 97% and 230 dB/km, respectively. In other words, substantially no shrinkage due to heat was observed, and the fluctuation in the transmission loss was little. The results of the measurement of the transmission loss are shown in a graph of FIG. 22.

Comparative Example 5

Referring to FIG. 13, a preform for plastic optical fiber 40 having a GI-type refractive index distribution was provided and was inserted into a fiber drawing furnace 41 in which the temperature in the core tube was set to 200° C.

When the above preform was subjected to fiber drawing at a linear velocity of 2 m/min so as to provide a center value of the resultant outer diameter of 650 µm. At the time of the above fiber drawing operation, the drawing tension was set to 120 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day, and then the shrinkage retention and transmission loss thereof were measured. As a result, they were found to be 90% and 300 dB/km, respectively. In other words, a somewhat larger shrinkage due to heat was observed, and the fluctuation in the transmission loss was also large. The results of the measurement of the transmission loss are shown in a graph of FIG. 22.

Comparative Example 6

Referring to FIG. 13, a preform for plastic optical fiber 40 having a GI-type refractive index distribution was provided and was inserted into a fiber drawing furnace 41 in which the temperature in the core tube was set to 200° C.

When the above preform was subjected to fiber drawing at a linear velocity of 3 m/min so as to provide a center value of the resultant outer diameter of 650 μm. At the time of the above fiber drawing operation, the drawing tension was set to 150 g.

When the transmission loss of the thus prepared GI-type plastic optical fiber 46 was measured, it was found to be 230 dB/km at a wavelength of 650 nm.

Then, the above fiber was subjected to a deterioration treatment at 80° C. for one day, and then the shrinkage retention and transmission loss thereof were measured. As a result, they were found to be 90% and 350 dB/km, respectively. In other words, a somewhat larger shrinkage due to heat was observed, and the fluctuation in the transmission loss was also large. The results of the measurement of the transmission loss are shown in a graph of FIG. 22.

Comparative Example 7

Referring to FIG. 13, a preform for plastic optical fiber 40 having a GI-type refractive index distribution was provided and was inserted into a fiber drawing furnace 41 in which the temperature in the core tube was set to 220° C.

When the above preform was subjected to fiber drawing at a linear velocity of 4 m/min so as to provide a center value of the resultant outer diameter of 650 μm. At the time of the above fiber drawing operation, the drawing tension was set to 130 g.

When the transmission loss of the thus prepared GI-type plastic optical fiber 46 was measured, it was found to be 240 dB/km at a wavelength of 650 nm.

Then, the above fiber was subjected to a deterioration treatment at 80° C. for one day, and then the shrinkage retention and transmission loss thereof were measured. As a result, they were found to be 80% and 400 dB/km, respectively. In other words, a somewhat larger shrinkage due to heat was observed, and the fluctuation in the transmission loss was also large. The results of the measurement of the transmission loss are shown in a graph of FIG. 22.

Figure 22:
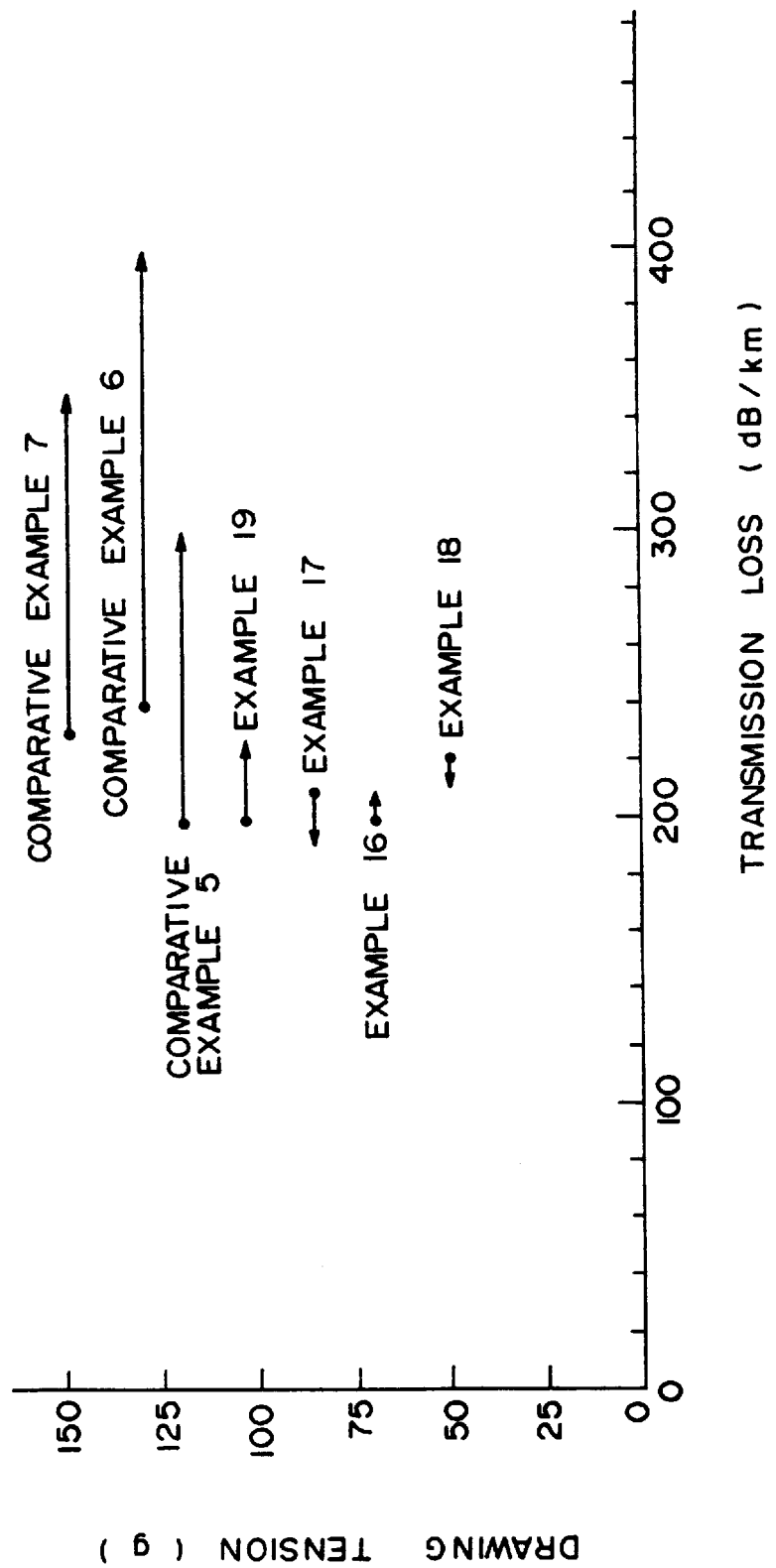
FIG. 22 is a graph showing a relationship between fiber drawing tension and transmission loss in each of the optical fibers obtained in Examples 16–19 and Comparative Examples 5–7.

As shown in the graph of FIG. 22 described above, in the drawing of a plastic optical fiber conducted in the above Examples 16–19, the fiber drawing was conducted while the fiber drawing tension was set to 100 g or less, whereby an optical fiber having a smaller shrinkage retention and a smaller fluctuation in the transmission loss could be obtained, as compared with the fiber obtained in Comparative Examples 5–7. In other words, in these Examples, it was found that the shrinkage after heat deterioration was suppressed and the increase in transmission loss was reduced.

EXAMPLE 20
(Production of fiber preform with jacket layer)

Referring to FIG. 4, methyl methacrylate (first-grade MMA) having a purity of 99% was further purified by distillation and subjected to polymerization to obtain a polymethyl methacrylate (PMMA) product (purity: 99.9%) which was used as a transparent polymer A.

The thus obtained PMMA (refractive index $N_a$=1.492) was used, and a starting rod 31 mainly comprising this polymer A (outer diameter: 5 mm) was formed.

The above polymer A (PMMA) was dissolved in a solvent (tetrahydrofuran: THF) in a predetermined ratio (concentration: about 30 wt. %) and the resultant solution was poured into a supply tank 34.

On the other hand, hexyl acetate as a refractive index modifier C having a refractive index (refractive index $N_c$=1.408) lower than that of the polymer A was dissolved in THF (concentration: 30 wt. %) to obtain a solution, and the resultant solution was stored in a refractive index modifier tank 354.

The rod member 31 obtained by the above procedure was mounted to an unshown rotating device and the solution of the raw material from the supply tank 343 was sprayed uniformly on the surface of the rod member 31 along the axis direction thereof, by use of a spraying device 32.

In the above spraying operation, the refractive index modifier C was gradually fed (flow rate: 10 ml/min) from the refractive index modifier tank 35 into the supply tank 34, so that the mixing ratio of the refractive index modifier C was increased at every spraying operation to decrease the refractive index of the coating solution. As a result, there was obtained a plastic optical fiber preform (outer diameter: 50 mm) having a GI-type refractive index distribution in which the refractive index was gradually decreased from the center of the preform toward the outer periphery thereof.

Then, a THF solution (concentration: 30 wt. %) of commercially available PMMA (purity: 90%) as a polymer A, having a lower purity than that of the above polymer A was poured into the supply tank 34, and the PMMA solution was applied onto the outer periphery the above cladding layer by use of the spraying device 32 and then dried in the same manner as described above, thereby to form a jacket layer (thickness: 5 mm).

In this Example, a thioether-type antioxidant (trade name: Sumirizer WX, mfd. by Sumitomo Chemical K.K.) was added to the above low-purity polymer A, for the forming the jacket layer in an amount of 3 wt. % based on the polymer Al, and there was obtained a plastic optical fiber preform including a jacket layer having a function of preventing opacification and of preventing coloring.

EXAMPLE 21

Preforms having a core diameter ($D_2$) of 20 mm and an outer diameter of 40 mm were prepared in the same manner as in Example 20 except that the thickness of the cladding layer ($D_1$) and the thickness of the jacket layer ($D_3$) as shown in FIG. 19 were set to values as shown in the Table of FIG. 23. Each of the thus prepared preforms was drawn under melting to obtain a GI-type plastic optical fiber having an outer diameter of 1 mm (Experiment Examples 1 to 3).

With respect to each of the plastic optical fibers thus obtained, the loss in transmission property thereof was measured by using light having a wavelength of 0.658 μm. The results of the measurement of the loss in transmission property are shown in the Table of FIG. 26.

FIG. 26 shows a difference in the cost of the material for the resultant fiber in terms of a difference in the cost of the material per 1 kg of the preform (each of the material cost for the preform is shown in terms of a relative value in a case where the material cost for "Experiment Example 1" in FIG. 26 is considered as "1").

As shown in the above Table of FIG. 26, this Example could provide plastic optical fibers having a good transmission property and a low production cost.

In addition, plastic optical fibers (Experiment Examples 4 and 5) were prepared in the same manner as in above Experiment Example 2 except that the anti-oxidant was not added to the jacket layer.

These optical fibers (Experiment Examples 1–5) were left standing in the outdoor open air for one month. As a result, the surfaces of the fibers of Experiment Examples 4 and 5 somewhat showed yellow coloration and the transmission properties thereof were decreased to 120 dB/km. On the other hand, the fiber of Experiment Example 2 showed no change in the color thereof, and showed no change in the transmission property thereof.

INDUSTRIAL APPLICABILITY

As described hereinabove, according to the present invention, it is possible to easily accomplish the control of a refractive index distribution which has been troublesome in the prior art, and to provide a GI-type plastic optical fiber preform with good reproducibility.

In the present invention on a plastic optical fiber production by a method of drawing of a plastic fiber (particularly, when the outer diameter of the resultant fiber is 1000 μm or less), by setting the tension for drawing to a value of 10 g or more, it is possible to further improve the resultant fiber in mechanical strength and long-term reliability.

Further, in the present invention on a plastic optical fiber production by a method of drawing of a plastic fiber, by setting the tension for drawing to a value of 100 g or less, it is possible to suppress the shrinkage of the resultant fiber, and the increase in the transmission loss even after the heat deterioration thereof.

Furthermore, according to the present invention, the following effects may be achieved even in the case of a plastic optical fiber preform having a jacket layer.

(1) In a case where a fiber preform comprising a plastic material is prepared by using a substance having the same material quality and having a high purity for all portions of the fiber preform, the production cost inevitably becomes higher. However, in a case where the neighborhood of the circumference of the cladding layer which does not contribute to light transmission is constituted by using a jacket layer having a lower purity, the resultant production cost may be decreased. For example, even when an optical fiber preform having the same specification or standard is produced, a part thereof may be formed by using a material having a lower purity, thereby to further reduce the production cost.

(2) Further, in an embodiment in which a functional material such as anti-oxidant, light absorbing agent, and light scattering agent is incorporated in the above jacket layer, it is easy to obtain a plastic optical fiber having any of such various functions.

(3) In an embodiment in which a refractive index modifier is incorporated in the same manner as described above, it is easy to obtain a GI-type plastic optical fiber preform in the same manner as in the formation of the above jacket layer.

We claim:

1. A preform for plastic optical fiber, comprising:
   a core comprising an organic polymer,
   a cladding layer comprising an organic polymer and disposed on the outer circumference of the core, and
   a jacket layer comprising a material which has the same quality and which comprises a monomer that is substantially common with a monomer constituting the cladding layer, and has a purity lower than that of the material constituting the cladding layer.

2. A preform for plastic optical fiber according to claim 1, wherein the jacket layer further comprises a functional material.

3. A preform for plastic optical fiber according to claim 2, wherein the functional material comprises at least one material selected from the group consisting of an anti-oxidant, a light absorbing agent and a light scattering agent.

4. The preform as claimed in claim 1, wherein at least 90 mol % of the monomer constituting the jacket layer is the same as the monomer constituting the polymer for the cladding layer.

5. The preform as claimed in claim 4, wherein at least 95 mol % of the monomer constituting the jacket layer is the same as the monomer constituting the polymer for the cladding layer.

6. The preform as claimed in claim 1, wherein the organic polymer of the cladding layer is a copolymer, and wherein the jacket layer comprises a copolymer, wherein the copolymer of the cladding layer includes monomers $M_1$ and $M_2$ used in amounts of $a_1$ mol and $b_1$ mol, respectively, and the copolymer of the jacket layer includes monomers $M_1$ and $M_2$ used in amounts of $a_2$ and $b_2$, respectively.

7. The preform as claimed in claim 6, wherein the value of $(a_2+b_2)/(a_1+b_1)$ is at least 90 mol %.

8. The preform as claimed in claim 7, wherein the value of $(a_2+b_2)/(a_1+b_1)$ is at least 95 mol %.

9. The preform as claimed in claim 1, wherein the core has a diameter $D_2$ and the cladding layer has a thickness $D_1$, and the preform is arranged such that the thickness $D_1$ of the cladding layer is not less than 10% of the diameter $D_2$ of the core.

10. The preform as claimed in claim 9, wherein the preform is arranged such that the thickness $D_1$ of the cladding layer is not less than 40% of the diameter $D_2$ of the core.

* * * * *